United States Patent
Sano et al.

(10) Patent No.: US 8,923,105 B2
(45) Date of Patent: Dec. 30, 2014

(54) OPTICAL INFORMATION DEVICE, CROSS-TALK REDUCTION METHOD, COMPUTER, PLAYER, AND RECORDER

(71) Applicant: Panasonic Corporation, Osaka (JP)

(72) Inventors: Kousei Sano, Osaka (JP); Yoshiaki Komma, Osaka (JP); Kanji Wakabayashi, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/364,546

(22) PCT Filed: Oct. 9, 2013

(86) PCT No.: PCT/JP2013/006031
§ 371 (c)(1),
(2), (4) Date: Jun. 11, 2014

(87) PCT Pub. No.: WO2014/057674
PCT Pub. Date: Apr. 17, 2014

(65) Prior Publication Data
US 2014/0341007 A1 Nov. 20, 2014

(30) Foreign Application Priority Data
Oct. 11, 2012 (JP) ................................. 2012-225641

(51) Int. Cl.
*G11B 7/00* (2006.01)
(52) U.S. Cl.
USPC ...................................... 369/44.32; 369/44.41
(58) Field of Classification Search
USPC .......... 369/44.27, 44.28, 44.32, 44.41, 44.42, 369/124.01, 47.28, 47.35, 47.44
See application file for complete search history.

(56) References Cited

U.S. PATENT DOCUMENTS

| 5,347,504 A | 9/1994 | Ito et al. |
| 5,430,701 A | 7/1995 | Ito et al. |
| 5,440,536 A | 8/1995 | Ito et al. |

(Continued)

FOREIGN PATENT DOCUMENTS

| JP | 5-36083 | 2/1993 |
| JP | 5-242512 | 9/1993 |

(Continued)

OTHER PUBLICATIONS

International Search Report issued Nov. 5, 2013 in International (PCT) Application No. PCT/JP2013/006031.

*Primary Examiner* — Nabil Hindi
(74) *Attorney, Agent, or Firm* — Wenderoth, Lind & Ponack, L.L.P.

(57) ABSTRACT

A ratio Xm of an information item recorded on an adjacent track relative to an information item recorded on a main track included in a first signal obtained from a first light flux having passed through a center region (6c) is different from ratios Xs1 and Xs2 of the information items recorded on the adjacent track relative to the information items recorded on the main track included in second and third signals obtained from second and third light fluxes having passed through first and second end regions (6r, 6l), and a ratio of respective gains of a first waveform equalizer (80c), a second waveform equalizer (80r), and a third waveform equalizer (80l) is determined so as to cancel the information item recorded on the adjacent track in each of frequency components of the first signal, the second signal, and the third signal.

14 Claims, 19 Drawing Sheets

(56) References Cited

U.S. PATENT DOCUMENTS 6,507,544 B1 * 1/2003 Ma et al. .................... 369/44.41
6,580,676 B1    6/2003 Yanagisawa et al.
2002/0027843 A1 3/2002 Kim et al.

FOREIGN PATENT DOCUMENTS

| JP | 8-249664 | 9/1996 |
|----|----------|--------|
| JP | 2000-48488 | 2/2000 |
| JP | 2001-357545 | 12/2001 |

* cited by examiner

OPTICAL INFORMATION DEVICE, CROSS-TALK REDUCTION METHOD, COMPUTER, PLAYER, AND RECORDER

TECHNICAL FIELD

The present invention relates to an optical information device that reproduces or records information for an optical information medium, a crosstalk reduction method that reduces crosstalk in the optical information device, a computer that includes the optical information device, a player that includes the optical information device, and a recorder that includes the optical information device.

BACKGROUND ART

Conventionally, in general, a CD, a DVD, or a Blu-ray (registered trademark) Disc is widely known as an optical disc. In recent years, a further improvement in the recording density of the optical disc is desired. In order to realize an optical disc information device that records or reproduces information at a high density, it is necessary to reduce a track pitch of the optical disc or improve the density of the optical disc in a line direction.

In order to improve the recording density of the optical disc information device, it is effective to reduce the track pitch of the optical disc.

However, when the track pitch is reduced, a problem arises that crosstalk in which a signal recorded on an adjacent track adjacent to a scanned track scanned with a converged light flux leaks into a reproduction signal is increased, and the signal having leaked thereinto becomes a noise of the reproduction signal.

To cope with this, in a conventional optical disc information device for solving the above problem, for example, as described in Patent Literature 1, a photodetector that is split into three portions in a direction orthogonal to a track is used in a one-beam optical system, and the crosstalk of an output signal S is cancelled by performing an arithmetic operation on light amount signals C, R, and L detected in central, right, and left light receiving sections based on Expression shown below.

$$S = K*C + R + L$$

K: constant

In addition, Patent Literature 2 discloses a configuration in which only a signal from a central light receiving section is subjected to waveform equalization using a transversal filter. In this example, an output signal from the central main light receiving section is subjected to waveform equalization so as not to be correlated with output signals from left and right sub-light receiving sections.

FIG. 27 is a view showing the configuration of a conventional photodetector. Light receiving sections 901a, 901b, and 901c obtained by splitting the photodetector into three regions receive a light beam 900, and output output signals corresponding to the amounts of the light emitted to the light receiving sections 901a, 901b, and 901c to amplifiers 902a, 902b, and 902c. The amplifiers 902a, 902b, and 902c amplify the output signals from the light receiving sections 901a, 901b, and 901c. Output signals from the amplifiers 902a, 902b, and 902c are converted from analog signals to digital signals by A/D converters 903a, 903b, and 903c.

Output signals of the A/D converters 903a and 903c to which the output signals of the light receiving sections 901a and 901c corresponding to side edge portions of the light beam 900 are given are directly inputted to an adder 905. An output signal of the A/D converter 903b to which the output signal of the light receiving section 901b corresponding to a central portion of the light beam 900 is given is inputted to the adder 905 via a transversal filter 904. The adder 905 adds up the input signals and outputs a signal obtained by the addition to an amplifier 906. An output signal of the amplifier 906 is used as an information reproduction signal.

The output signal of the adder 905 is given to a factor control circuit 907 for feedback control, and an output signal of the factor control circuit 907 is given to the transversal filter 904. The factor control circuit 907 controls an integrating factor of the transversal filter 904. With this, the transversal filter 904 performs the waveform equalization on the output signal of the light receiving section 901b corresponding to the central portion of the light beam 900 such that the output signal thereof is not correlated with the respective output signals of the light receiving sections 901a and 901c corresponding to the side edge portions of the light beam 900, i.e., such that the respective output signals of the light receiving sections 901a and 901c corresponding to the side edge portions of the light beam 900 do not interfere with the output signal thereof.

The technology described in Patent Literature 1 has an effect of reducing the crosstalk as the signal leaked from the adjacent track by a specific amount. However, when the track pitch is reduced and the crosstalk is increased, there are cases where the effect of the technology described in Patent Literature 1 alone is not sufficient.

The technology described in Patent Literature 2 has the configuration in which the output signal of the light receiving section corresponding to the central portion is subjected to the waveform equalization so as not to be correlated with the output signals of the light receiving sections corresponding to the side edge portions. However, the output signal of the light receiving section corresponding to the central potion and each of the output signals of the light receiving sections corresponding to the side edge portions include a signal component of a main track and a crosstalk signal component from an adjacent track at different ratios. Accordingly, a condition of a waveform equalizer for minimizing the crosstalk signal component from the adjacent track is different from a condition of the waveform equalizer for eliminating the correlation between the output signal of the light receiving section corresponding to the central portion and the output signals of the light receiving portions corresponding to the side edge portions. Consequently, even when the output signal of the light receiving section corresponding to the central portion is subjected to the waveform equalization using the waveform equalizer that eliminates the correlation between the output signal of the light receiving section corresponding to the central portion and the output signals of the light receiving sections corresponding to the side edge portions, there still remains a problem that the crosstalk amount is not minimized.

CITATION LIST

Patent Literature

Patent Literature 1: Japanese Patent Application Laid-open No. H5-242512
Patent Literature 2: Japanese Patent Application Laid-open No. H5-36083

SUMMARY OF THE INVENTION

The present invention has been achieved in order to solve the above problem, and an object thereof is to provide an optical information device, a crosstalk reduction method, a computer, a player, and a recorder capable of reducing the crosstalk amount from the adjacent track and reproducing information at a low error rate even when the recording density in a track direction is increased.

An optical information device according to an aspect of the present invention includes a laser light source that emits a light flux, an objective lens that converges the light flux emitted from the laser light source on an optical information medium having an information track on which information is recorded in a row, a split element that includes a center region including the center of an optical axis, a first end region disposed adjacent to one side of the center region in a direction perpendicular to a tangent to the information track, and a second end region disposed adjacent to the other side of the center region in the direction perpendicular to the tangent to the information track, and splits the light flux reflected and diffracted on the optical information medium into a first light flux passing through the center region, a second light flux passing through the first end region, and a third light flux passing through the second end region, a photodetector that receives the first light flux, the second light flux, and the third light flux obtained by splitting by the split element, and outputs a first signal, a second signal, and a third signal corresponding to light amounts of the received first light flux, the received second light flux, and the received third light flux, a first waveform equalizer that gives a gain corresponding to a frequency component of the first signal to the first signal outputted from the photodetector, a second waveform equalizer that gives a gain different from the gain of the first signal corresponding to a frequency component of the second signal to the second signal outputted from the photodetector, a third waveform equalizer that gives a gain different from the gains of the first signal and the second signal corresponding to a frequency component of the third signal to the third signal outputted from the photodetector, an adder that adds up output signals from the first waveform equalizer, the second waveform equalizer, and the third waveform equalizer, and a reproduction signal processing section that outputs a signal obtained by the addition by the adder as an information reproduction signal, the information track scanned with the light flux converged by the objective lens is assumed to be a main track and the information track adjacent to the main track is assumed to be an adjacent track, the first signal, the second signal, and the third signal outputted from the photodetector include both of information recorded on the main track and information recorded on the adjacent track, a ratio Xm of the information recorded on the adjacent track relative to the information recorded on the main track included in the first signal obtained from the first light flux having passed through the center region is different from a ratio Xs1 of the information recorded on the adjacent track relative to the information recorded on the main track included in the second signal obtained from the second light flux having passed through the first end region and also different from a ratio Xs2 of the information recorded on the adjacent track relative to the information recorded on the main track included in the third signal obtained from the third light flux having passed through the second end region, and a ratio among the respective gains of the first waveform equalizer, the second waveform equalizer, and the third waveform equalizer is determined so as to cancel the information recorded on the adjacent track in each of the frequency components of the first signal, the second signal, and the third signal.

According to the present invention, it is possible to reduce the crosstalk amount from the adjacent track, and reproduce information at a low error rate even when the recording density in the track direction is increased.

Objects, features, and advantages of the present invention will become more apparent from the following detailed description and the accompanying drawings.

DESCRIPTION OF EMBODIMENTS

Hereinbelow, a description will be given of embodiments of the present invention with reference to the drawings. Note that each of the following embodiments is an example in which the present invention is embodied, and is not intended to limit the technical scope of the present invention.

First Embodiment

Figure 1:
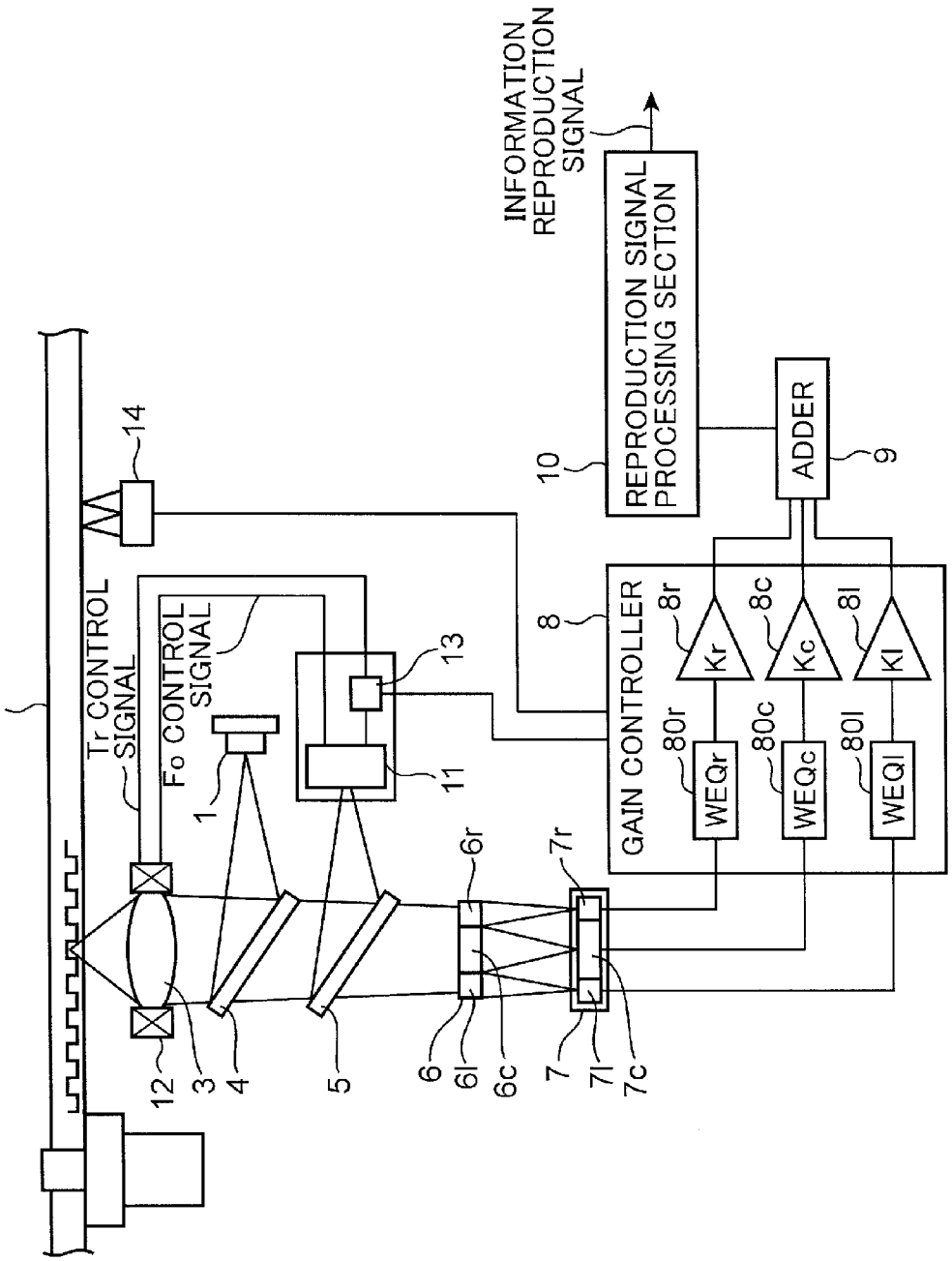
FIG. 1 is a diagrammatic view showing a configuration of an optical disc information device in a first embodiment of the present invention.
Figure 2:
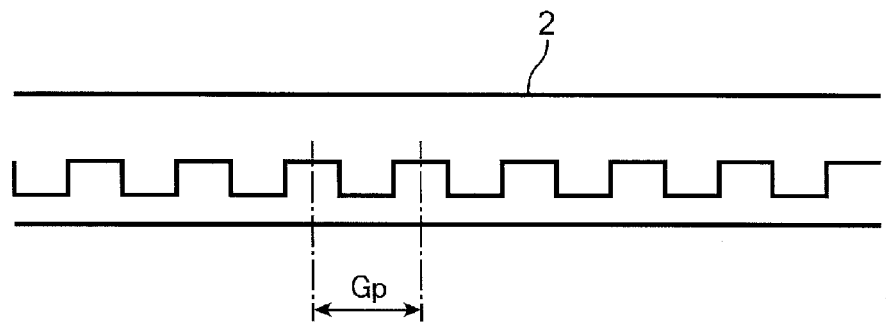
FIG. 2 is a schematic view showing a groove structure of an optical disc in the first embodiment of the present invention.
Figure 3:
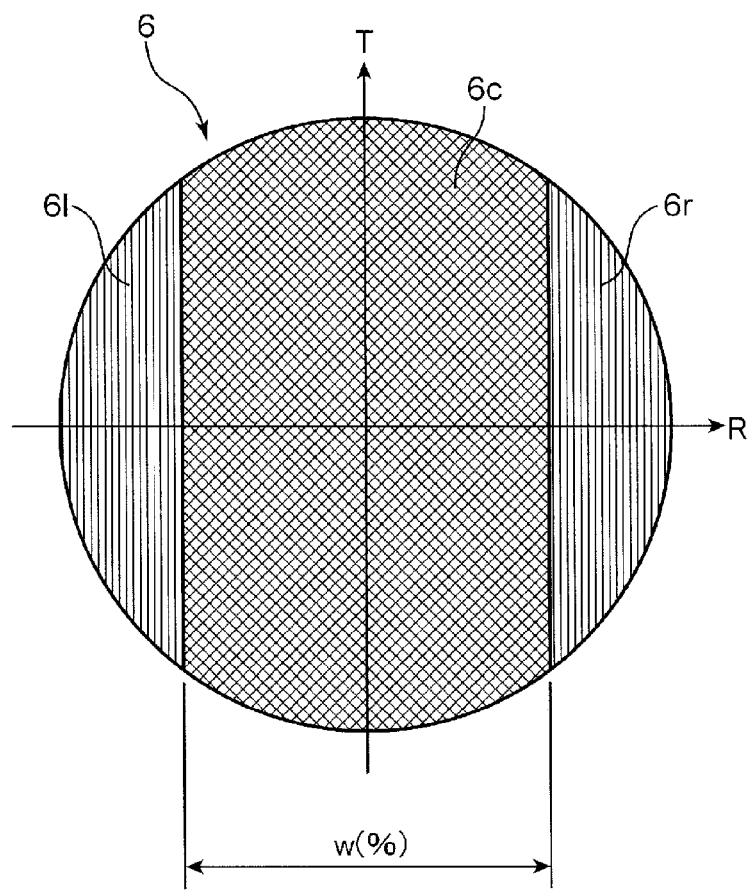
FIG. 3 is a schematic view showing a split structure of a split element of the optical disc information device in the first embodiment of the present invention.

FIG. 1 is a diagrammatic view showing a configuration of an optical disc information device in a first embodiment of the present invention, FIG. 2 is a schematic view showing a groove structure of an optical disc in the first embodiment of the present invention, and FIG. 3 is a schematic view showing a split structure of a split element of the optical disc information device in the first embodiment of the present invention.

The optical disc information device shown in FIG. 1 includes a blue semiconductor laser 1, an objective lens 3, a laser mirror 4, a beam splitter 5, a split element 6, a photodetector 7, a gain controller 8, an adder 9, a reproduction signal processing section 10, a control signal processing section 11, an objective lens actuator 12, a tracking switcher 13, and a tilt detector 14. The photodetector 7 includes a first light receiving section 7c, a second light receiving section 7r, and a third light receiving section 7l. The gain controller 8 includes a first waveform equalizer 80c, a second waveform equalizer 80r, a third waveform equalizer 80l, a first amplifier 8c, a second amplifier 8r, and a third amplifier 8l.

In FIG. 1, light having a wavelength of 400 nm to 415 nm is emitted from the blue semiconductor laser 1 as a laser light source. In the present first embodiment, the blue semiconductor laser 1 emits a light beam having a wavelength of approximately 405 nm. The light beam (light flux) emitted from the blue semiconductor laser 1 is reflected by the laser mirror 4 and travels toward the objective lens 3. The blue light beam narrowed by the objective lens 3 is emitted so as to be converged on, e.g., a groove portion on an information recording surface of an optical disc 2.

The numerical aperture of the objective lens 3 is 0.85. The objective lens 3 condenses the light beam having a wavelength of approximately 405 nm. The objective lens 3 converges the light flux emitted from the blue semiconductor laser 1 on the optical disc 2.

As shown in FIG. 2, the optical disc 2 has a groove-like track, and can record information in a land portion and the groove portion. In the present first embodiment, a groove pitch Gp is set to 0.48 μm, i.e., a track pitch Tp is set to 0.24 μm. Herein, the track pitch Tp of a BD (Blu-ray (registered trademark) Disc) is 0.32 μm. Consequently, as compared with the track pitch Tp of the BD, the track pitch Tp of the optical disc 2 in the present first embodiment is reduced to 0.24 μm, and hence it can be expected that the recording density is increased by about 1.8 times.

Returning to FIG. 1, and the description is continued. Reflection light reflected and diffracted on the information recording surface of the optical disc 2 passes through the objective lens 3 similarly to its previous travel, passes through the laser mirror 4 and the beam splitter 5, and reaches the split element 6. The split element 6 is a diffractive element produced so as to operate as a diffraction grating by forming fine grooves on its glass surface.

As shown in FIG. 3, the split element 6 is split into three portions in a direction corresponding to a radial direction R of the optical disc 2 (a direction perpendicular to the tangent to a track). The split element 6 includes a center region 6c, and a first end region 6r and a second end region 6l that sandwich the center region 6c. The light beam having passed through the individual regions is separated by the diffraction gratings of the individual regions in different directions. In the present first embodiment, a width w of the center region 6c of the split element 6 in the radial direction R is set to about 35% of the diameter of the light beam.

The split element 6 includes the center region 6c including the center of the optical axis, the first end region 6r disposed adjacent to one side of the center region 6c in the direction perpendicular to the tangent to an information track, and the second end region 6l disposed adjacent to the other side of the center region 6c in the direction perpendicular to the tangent to the information track. That is, the split element 6 includes the center region 6c including the center of the optical axis, the first end region 6r disposed adjacent to the center region 6c in the direction perpendicular to the tangent to the track, and the second end region 6l disposed so as to be symmetrical with the first end region 6r relative to a straight line that passes through the center of the optical axis and is parallel with the tangent to the track. The split element 6 splits the light flux reflected and diffracted on the optical disc 2 into a first light flux that passes through the center region 6c, a second light flux that passes through the first end region 6r, and a third light flux that passes through the second end region 6l.

Returning to FIG. 1 and the description is continued. The three light beams obtained by splitting in the split element 6 enter different light receiving sections of the photodetector 7. That is, the light beam having passed through the center region 6c enters the first light receiving section 7c of the photodetector 7, the light beam having passed through the first end region 6r enters the second light receiving section 7r, and the light beam having passed through the second end region 6l enters the third light receiving section 7l.

The photodetector 7 receives the first light flux, the second light flux, and the third light flux obtained by splitting by the split element 6, and outputs a first signal, a second signal, and a third signal corresponding to the light amounts of the received first, second, and third light fluxes. The first light receiving section 7c, the second light receiving section 7r, and the third light receiving section 7l of the photodetector 7 output the signals corresponding to the received light amounts. The respective signals outputted from the first light receiving section 7c, the second light receiving section 7r, and the third light receiving section 7l are inputted to the first waveform equalizer 80c, the second waveform equalizer 80r, and the third waveform equalizer 80l of the gain controller 8.

The first waveform equalizer 80c gives a gain corresponding to the frequency component of the first signal to the first signal outputted from the first light receiving section 7c of the photodetector 7. The second waveform equalizer 80r gives a gain different from the gain of the first signal that corresponds to the frequency component of the second signal to the second signal outputted from the second light receiving section 7r of the photodetector 7. The third waveform equalizer 80l gives a gain different from the gains of the first and second signals that corresponds to the frequency component of the third signal to the third signal outputted from the third light receiving section 7l of the photodetector 7. Output signals from the first waveform equalizer 80c, the second waveform equalizer 80r, and the third waveform equalizer 80l are inputted to the first amplifier 8c, the second amplifier 8r, and the third amplifier 8l, respectively.

The first amplifier 8c, the second amplifier 8r, and the third amplifier 8l add optimum gains Kr, Kc, and Kl to the inputted signals, and output the signals to the adder 9. The adder 9 adds up the output signals from the first amplifier 8c, the second amplifier 8r, and the third amplifier 8l. An information signal outputted from the adder 9 becomes a signal in which crosstalk as leakage of a signal from an adjacent track is suppressed. By using the signal outputted from the adder 9 as a RF signal, it is possible to reduce an error rate. The reproduction signal processing section 10 outputs the signal subjected to the addition by the adder 9 as an information reproduction signal. With this, the information reproduction signal is reproduced at a low error rate.

Note that the gain controller 8 may not include the first amplifier 8c, the second amplifier 8r, and the third amplifier 8l, and the adder 9 may add up the output signals from the first waveform equalizer 80c, the second waveform equalizer 80r, and the third waveform equalizer 80l.

On the other hand, part of the reflection light reflected and diffracted on the information recording surface of the optical disc 2 is reflected by the beam splitter 5, and is received by the control signal processing section 11. The control signal processing section 11 generates a focusing control signal (Fo control signal) and a tracking control signal (Tr control signal) from a signal corresponding to the received light amount. The focusing control signal and the tracking control signal are outputted to the objective lens actuator 12, and a focusing operation and a tracking operation of the objective lens 3 are performed by the objective lens actuator 12. In the present first embodiment, although the track pitch Tp is 0.24 μm and is lower than the diffraction limit of the light beam, the groove pitch Gp is 0.48 μm, and it is possible to obtain a tracking error signal having a sufficient amplitude.

The tracking switcher 13 inverts the polarity of the tracking control signal in accordance with whether a scanned track scanned with a condensing spot is the land portion or the groove portion of the optical disc 2.

In addition, the gain controller 8 switches the combination of the gain generated in the gain controller 8 in response to the switching between the land portion and the groove portion by obtaining polarity switching timing information from the tracking switcher 13. Consequently, it is possible to solve a problem in which, since the land portion and the groove portion have different reflectances, the relationship between the scanned track and the adjacent track is inverted in accordance with whether the scanned track is the land portion or the groove portion and the effect of removing the crosstalk is lost. As a result, it is possible to record or reproduce the information signal with high accuracy by suppressing the leakage of the signal from the adjacent track and reducing the error rate.

Figure 4:
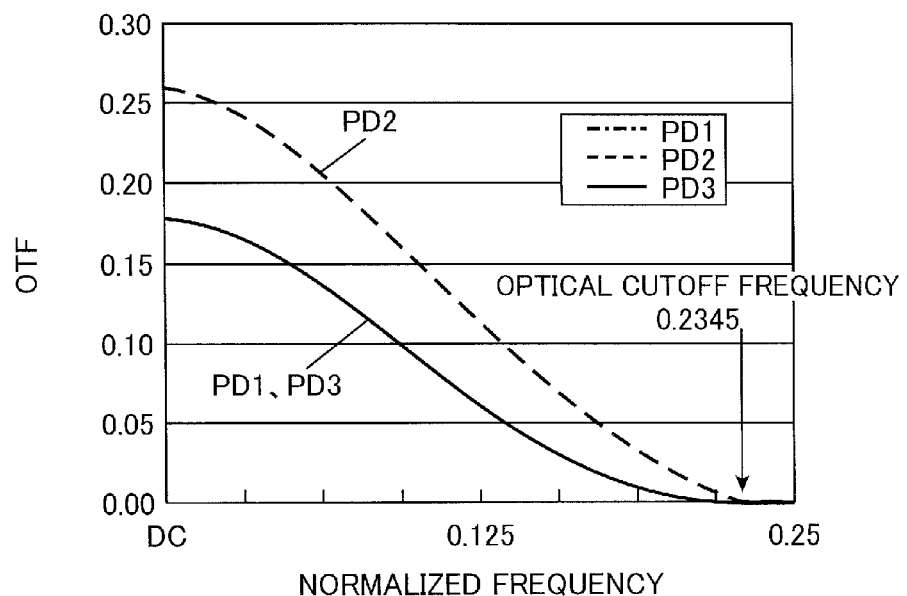
FIG. 4 is a view showing a frequency characteristic of an amplitude of an OTF for each region of a main track in the first embodiment of the present invention.

FIG. 4 is a view showing a frequency characteristic of an amplitude of an OTF for each region of a main track in the first embodiment of the present invention. FIG. 4 shows the frequency characteristic of the amplitude of an optical transfer function (OTF) of the signal outputted from each light receiving section of a far field. As shown above, among parameters of an optical system, the numerical aperture NA is 0.85 and the wavelength λ, is 405 nm. Among parameters of the optical disc, the groove pitch is 0.48 μm, a width ratio between the land portion and the groove portion is 1:1, the depth of the groove is 0.03λ, and a mark width is 0.16 μm. The OTF has been calculated by calculating the reproduction signal of an isolated mark for each of regions obtained by splitting the far field into three (the width of the center region is 35% of the entire width), and performing Fourier transformation on each reproduction signal. The horizontal axis of the graph indicates a normalized frequency. Herein, a mark string with 1T (channel clock) of 55.87 nm is assumed, and the normalized frequency shows a value obtained by normalization with a frequency corresponding to a period of 55.87 nm. The normalized frequency of 0.25 corresponds to a frequency corresponding to a period of 4T (repetition of 2T mark and 2T space). The vertical axis indicates the amplitude of the OTF in the case where the main track scanned with a light spot is reproduced, and is an arbitrary unit. The period of optical cutoff of the optical system shown here is 238.2 nm from the relationship of λ/2NA and corresponds to 0.2345 in terms of the normalized frequency.

FIG. 4 shows the relationship between the normalized frequency and the OTF of each of a first signal PD2 corresponding to the received light amount of the first light flux having passed through the center region 6c, a second signal PD1 corresponding to the received light amount of the second light flux having passed through the first end region 6r, and a third signal PD3 corresponding to the received light amount of the third light flux having passed through the second end region 6l.

Figure 5:
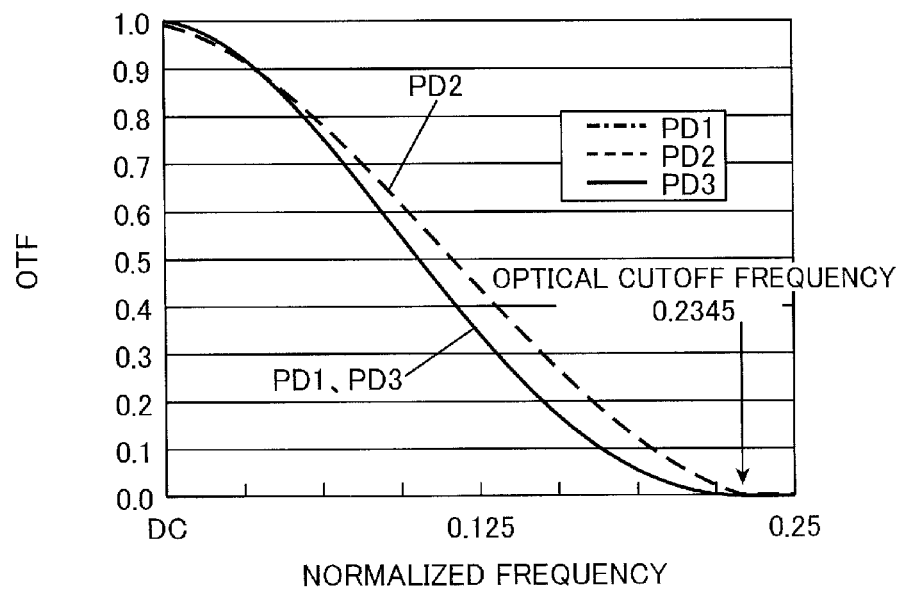
FIG. 5 is a view showing a normalized frequency characteristic of the amplitude of the OTF for each region of the main track in the first embodiment of the present invention.

FIG. 5 is a view showing the normalized frequency characteristic of the amplitude of the OTF for each region of the main track in the first embodiment of the present invention. FIG. 5 shows the frequency characteristic when each of the first signal, the second signal, and the third signal shown in FIG. 4 is normalized with an OTF value at a DC level. FIG. 5 shows the OTF value in the case where the main track scanned with the light spot is reproduced. As shown in FIG. 5, in a high frequency band close to the optical cutoff, the OTF values of the second signal PD1 corresponding to the received light amount of the second light flux having passed through the first end region 6r and the third signal PD3 corresponding to the received light amount of the third light flux having passed through the second end region 6l are lower than the OTF value of the first signal PD2 corresponding to the received light amount of the first light flux having passed through the center region 6c.

Figure 6:
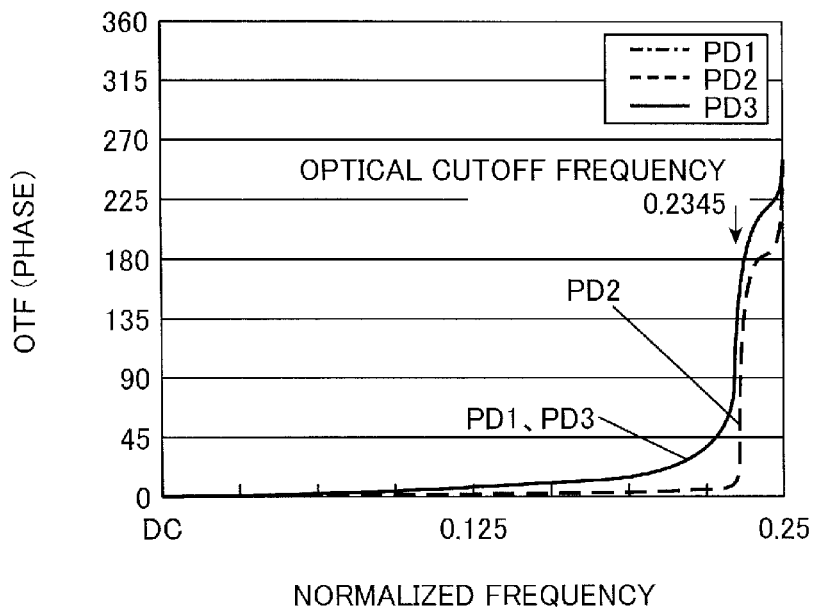
FIG. 6 is a view showing the frequency characteristic of a phase of the OTF for each region of the main track in the first embodiment of the present invention.

FIG. 6 is a view showing the frequency characteristic of the phase of the OTF for each region of the main track in the first embodiment of the present invention. FIG. 6 shows the relationship between the phase of the OTF and the normalized frequency. FIG. 6 shows the OTF value in the case where the main track scanned with the light spot is reproduced. In each of the first signal PD2 corresponding to the received light amount of the first light flux having passed through the center region 6c, the second signal PD1 corresponding to the received light amount of the second light flux having passed through the first end region 6r, and the third signal PD3 corresponding to the received light amount of the third light flux having passed through the second end region 6l, the phase of the OTF is changed by 180 degrees at the optical cutoff frequency. The phase of the OTF of the first signal PD2 corresponding to the received light amount of the first light flux having passed through the center region 6c is sharply changed in the vicinity of the optical cutoff frequency. In contrast to this, the phase of the OTF of each of the second signal PD1 corresponding to the received light amount of the second light flux having passed through the first end region 6r and the third signal PD3 corresponding to the received light amount of the third light flux having passed through the second end region 6l starts to be gradually changed before the optical cutoff frequency.

Figure 7:
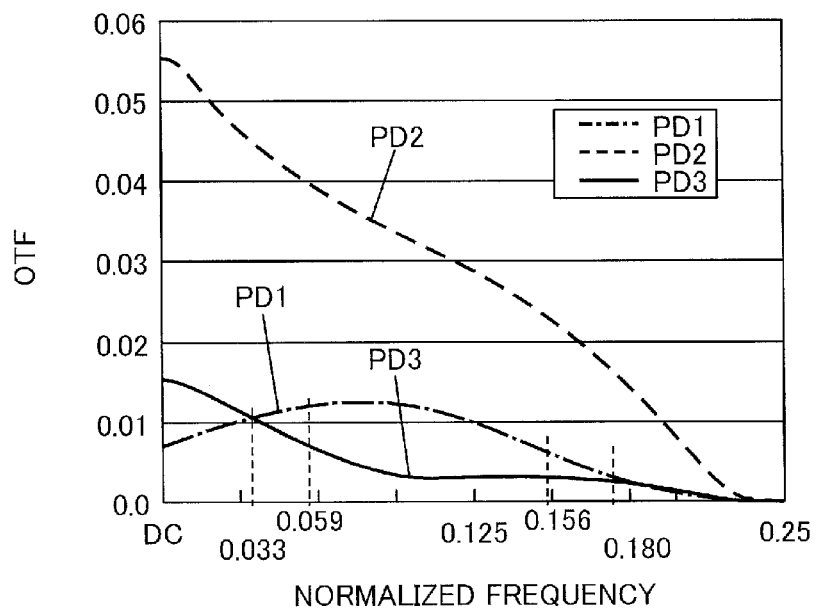
FIG. 7 is a view showing the frequency characteristic of the amplitude of the OTF for each region of an adjacent track in the first embodiment of the present invention.
Figure 8:
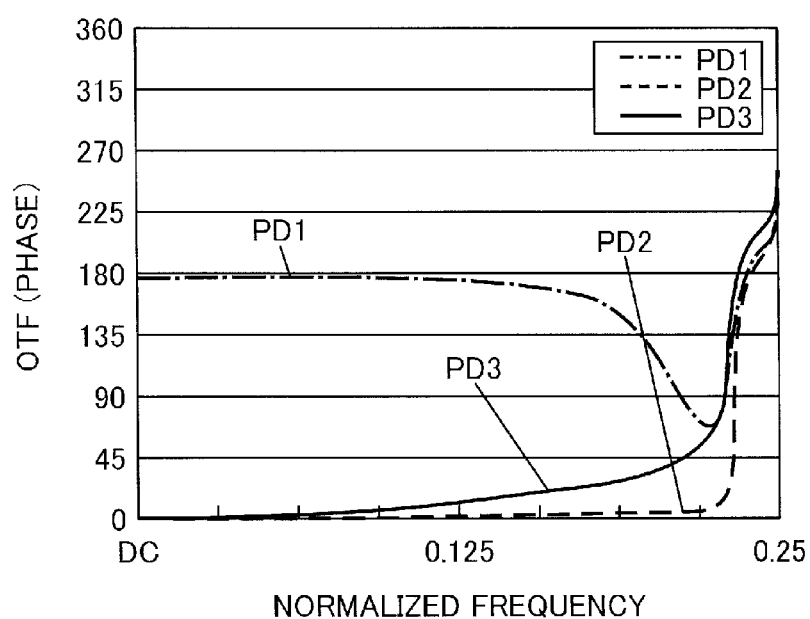
FIG. 8 is a view showing the frequency characteristic of the phase of the OTF for each region of the adjacent track in the first embodiment of the present invention.

FIG. 7 is a view showing the frequency characteristic of the amplitude of the OTF for each region of the adjacent track in the first embodiment of the present invention. FIG. 8 is a view showing the frequency characteristic of the phase of the OTF for each region of the adjacent track in the first embodiment of the present invention. Note that FIG. 7 shows the relationship between the amplitude of the OTF calculated from the signal obtained by reproducing the adjacent track (a position obtained by off-track of 0.24 μm from a track with a mark) and the normalized frequency, and FIG. 8 shows the relationship between the phase of the OTF calculated from the signal obtained by reproducing the adjacent track (the position obtained by off-track of 0.24 μm from the track with the mark) and the normalized frequency.

In the case where the adjacent track is reproduced, the phase of the OTF of the second signal PD1 corresponding to the received light amount of the second light flux having passed through the first end region 6r is inverted by 180 degrees, and the polarity of the OTF of the second signal PD1 differs. In addition, in the frequency in a middle frequency band, the amplitude of the OTF of the third signal PD3 corresponding to the received light amount of the third light flux having passed through the second end region 6l is smaller than the amplitude of the OTF of the first signal PD2 corresponding to the received light amount of the first light flux having passed through the center region 6c.

From these points, it is seen that it is possible to reduce the amplitude of the signal from the adjacent track (crosstalk) by increasing the ratio of the signal corresponding to the end region as compared with the ratio of the signal corresponding to the center region. From the result of calculation of the OTF, it is seen that the effect of reducing the crosstalk differs from one frequency to another. Consequently, in the frequency in the middle frequency band, the gain of each of the second signal PD1 corresponding to the received light amount of the second light flux having passed through the first end region 6r and the third signal PD3 corresponding to the received light amount of the third light flux having passed through the second end region 6l is made higher than the gain of the first signal PD2 corresponding to the received light amount of the first light flux having passed through the center region 6c. In addition, this effect is reduced in the frequency in a high frequency band. With this, it is possible to effectively reduce the crosstalk.

Herein, the length of the repetition is represented as the normalized frequency from the relationship with the OTF. However, the optical disc is actually rotated at a predetermined linear speed or RPM, the above-described characteristics are displayed on a per signal frequency band basis. That is, with regard to the signal of the main track, the frequency characteristic of the signal corresponding to the end region is reduced early in the high frequency band as compared with the frequency characteristic of the signal corresponding to the center region. In addition, with regard to the signal of the adjacent track, the phase of the signal corresponding to one of the two end regions is inverted as opposed to the phase of the signal corresponding to the center region.

Figure 9:
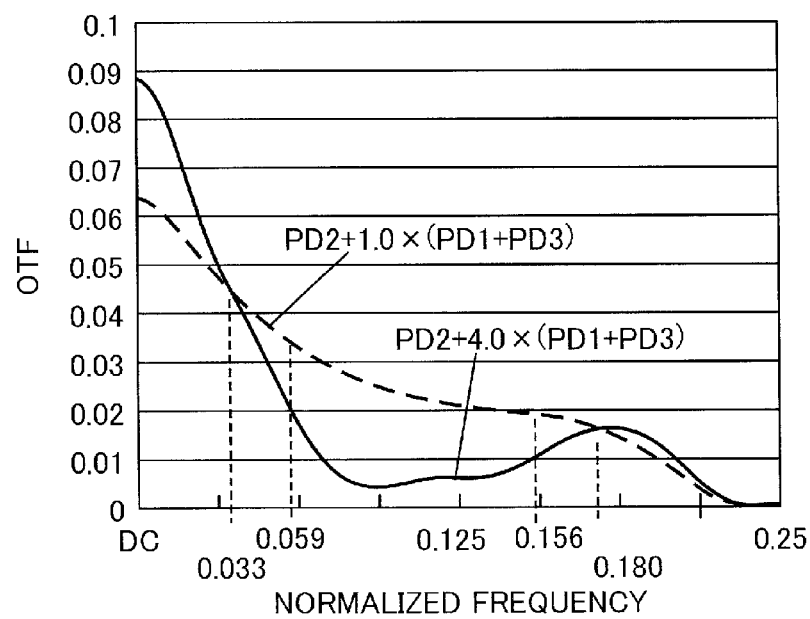
FIG. 9 is a view showing the frequency characteristic of the amplitude of the OTF after an arithmetic operation for each region of the adjacent track in the first embodiment of the present invention.

FIG. 9 is a view showing the frequency characteristic of the amplitude of the OTF after an arithmetic operation for each region of the adjacent track in the first embodiment of the present invention. FIG. 9 shows the relationship between the OTF after the arithmetic operation and the normalized frequency. Note that FIG. 9 shows the relationship between the amplitude of the OTF calculated from the signal obtained by reproducing the adjacent track and the normalized frequency. The characteristic shown in FIG. 9 shows the amplitude of the OTF in the case where the first signal PD2, the second signal PD1, and the third signal PD3 are added up at an equal ratio (PD2+1.0×(PD1+PD3)) and the amplitude of the OTF in the case where the second signal PD1 and the third signal PD3 are multiplied by 4 and the result of the multiplication is added to the first signal PD2 (PD2+4.0×(PD1+PD3)).

As shown in FIG. 5, in the case where the main track is reproduced, the OTF amplitude of the first signal PD2 corresponding to the received light amount of the first light flux having passed through the center region 6c maintains a certain value up to a frequency immediately before the optical cutoff frequency, but the OTF amplitude of each of the second signal PD1 corresponding to the received light amount of the second light flux having passed through the first end region 6r and the third signal PD3 corresponding to the received light amount of the third light flux having passed through the second end region 6l is significantly reduced before the optical cutoff frequency. This denotes that only the signal corresponding to the center region has the component of this period.

Accordingly, in the case where waveform equalization is performed, efficiency is higher when the signal corresponding to the center region has the gain. In order to cancel the crosstalk, it is necessary to multiply the signal corresponding to the end region by a coefficient larger than 1 and add the multiplication result to the signal corresponding to the center region. However, when the signal corresponding to the end region in the vicinity of the optical cutoff frequency is allowed to have a large gain, the optical signal is small as compared with a noise so that the noise is enhanced and the entire S/N is deteriorated. Consequently, it is effective in terms of signal processing to set the gain in the high frequency band in the vicinity of the optical cutoff frequency to a large value in the first waveform equalizer (WEQc) 80c that processes the signal corresponding to the center region, but it is better not to set the gain in the high frequency band in the vicinity of the optical cutoff frequency to a large value in each of the second waveform equalizer (WEQr) 80r and the third waveform equalizer (WEQl) 80l that process the signals corresponding to the end regions.

On the other hand, as shown in FIG. 7, in the case where the adjacent track is reproduced, the OTF amplitude of the second signal PD1 corresponding to the received light amount of the second light flux having passed through the first end region 6r as one of the two end regions is maximized at the frequency that corresponds to about a half of the optical cutoff frequency. In addition, as shown in FIG. 8, the OTF phase of the second signal PD1 is inverted by 180 degrees in the band of the frequency corresponding to about a half of the optical cutoff frequency. As a result, it is seen that the component of the second signal PD1 has the polarity opposite to that of the component of each of the signals PD2 and PD3 corresponding to the other regions. That is, a crosstalk component in the band of the frequency corresponding to about a half of the optical cutoff frequency included in the second signal PD1 corresponding to the received light amount of the second light flux having passed through the first end region 6r and the signals PD2 and PD3 corresponding to the other regions cancel each other out.

In conventional crosstalk removal processing, the frequency characteristic is not particularly considered, and the crosstalk is canceled by amplifying the signal corresponding to the end region by using a specific coefficient and adding up the amplified signal and the signal corresponding to the center region. In contrast to this, from the results of FIG. 7 and FIG. 8, it is seen that a phenomenon in which the polarities of the signal corresponding to one of the two end regions and the signal corresponding to the other one of the two regions are different is effectively caused in the vicinity of the middle frequency band corresponding to the half of the optical cutoff frequency.

Consequently, by increasing the gain of the frequency in the middle frequency band in the second waveform equalizer (WEQr) 80r and the third waveform equalizer (WEQl) 80l that process the signals corresponding to the end regions, it is possible to cancel the crosstalk more efficiently than by multiplying the entire frequency band by the coefficient and giving the gain to the signal corresponding to the end region. With this, it is possible to suppress an increase in noise to a level lower than a level in the case where the gain in the entire frequency band is increased.

Thus, in the second waveform equalizer 80r and the third waveform equalizer 80l, the gain of the middle frequency as the half of the high frequency corresponding to a distance equivalent to optical cutoff Fc=$\lambda$/(2·NA) is larger than the gain of the high frequency. In addition, in the first waveform equalizer 80c, the gain of the high frequency is larger than the gain of the middle frequency.

Since each of FIGS. 7 and 8 shows the OTF characteristic of the adjacent track on only one side of the main track, the signal corresponding to one of the end regions (the second signal PD1) and the signal corresponding to the other end region on the opposite side (the third signal PD3) have different characteristics. At this point, when the positions of the adjacent tracks on the right side and the left side are interchanged, the OTF characteristics are also interchanged. Consequently, by setting the characteristics of the two waveform equalizers that process the signals corresponding to the two end regions to similar characteristics on the right side and the left side, it is possible to simultaneously remove the crosstalk from the adjacent tracks on both sides of the main track.

When it is assumed that the optical disc having the mark string with 1T of 55.78 nm assumed above is rotated at a linear speed of 7.4 m/sec, transit time of the 1T is 7.54 nsec. The frequency of the mark string having a period of 4T with repetition of 2T mark and 2T space corresponds to 33 MHz. As the configuration of the waveform equalizer, for example, there can be considered a three-tap transversal filter shown in FIG. 10. Herein, the transversal filter of FIG. 10 will be briefly described.

Figure 10:
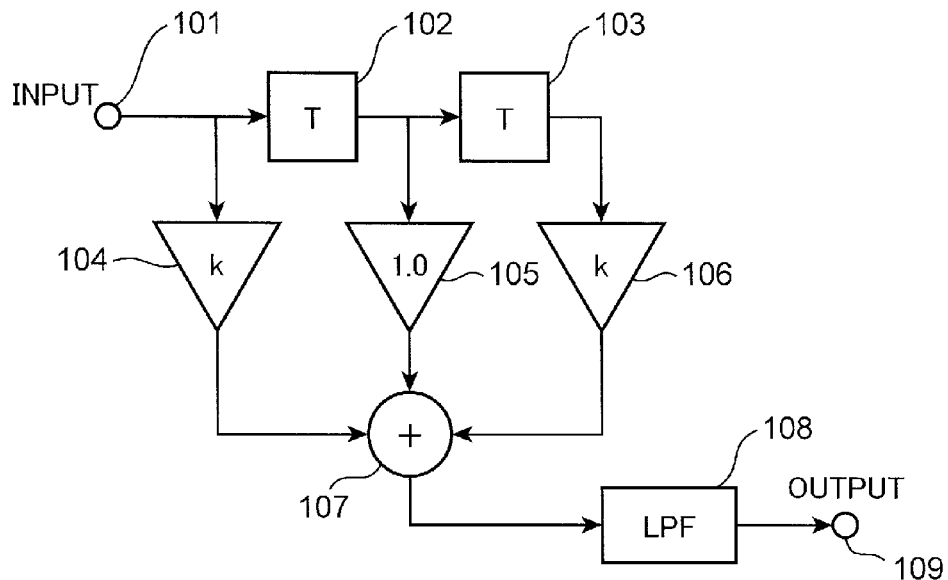
FIG. 10 is a view showing a configuration of a waveform equalizer in the first embodiment of the present invention.
Figure 11:
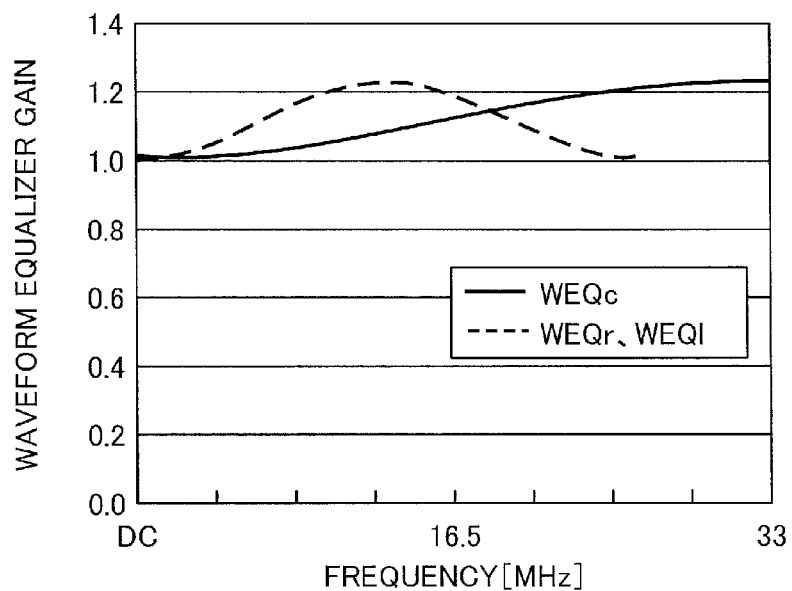
FIG. 11 is a view showing the frequency characteristic of a gain used in each of first to third waveform equalizers.

FIG. 10 is a view showing the configuration of the waveform equalizer in the first embodiment of the present invention. FIG. 11 is a view showing the frequency characteristic of the gain used in each of the first to third waveform equalizers.

A signal inputted from an input end 101 is delayed by a delay amount T by two delay devices 102 and 103. Output signals from the input end 101 and the delay devices 102 and 103 are inputted to amplifiers 104, 105, and 106, and are multiplied by a predetermined gain. Respective output signals of the amplifiers 104, 105, and 106 are added up in an adder 107. A signal obtained by the addition is inputted to a low-pass filter 108. The low-pass filter 108 reduces a signal in a high frequency band. A signal in which the signal in the high frequency band is reduced is outputted from an output end 109.

Herein, when it is assumed that the delay amount T of each of the delay devices 102 and 103 is 15 nsec, a multiplying factor k as the gain of each of the amplifiers 104 and 106 of the taps at both ends is −0.1, and a multiplying factor as the gain of the amplifier 105 of the tap at the center is 1.0, the waveform equalizer can provide a gain of 1.22 times at 33 MHz relative to a low frequency band. The frequency characteristic of this gain is represented by a solid line WEQc of FIG. 11.

On the other hand, in the case where the peak of the gain is provided at 13 MHz as the frequency of the mark string having a period of 10T with repetition of 5T mark and 5T space as an example in which the gain in the middle frequency band is increased as the characteristic of the waveform equalizer that processes the signal corresponding to the end region, it is only necessary to set the delay amount T of each of the delay devices 102 and 103 shown in FIG. 10 to 38 nsec. When it is assumed that the multiplying factor k as the gain of each of the amplifiers 104 and 106 of the taps at both ends is −0.1 and the multiplying factor as the gain of the amplifier 105 of the tap at the center is 1.0, the waveform equalizer can provide the gain of 1.22 times at 13 MHz relative to the low frequency band. The frequency characteristic of this gain is represented by a broken line WEQr, WEQl of FIG. 11.

Although the gain is increased again at a frequency of 26 MHz or more only with the transversal filter, it is possible to eliminate an unnecessary increase in gain in the high frequency band by causing the output of the transversal filter to pass through the appropriate low-pass filter (LPF) 108.

In the case of this example, when the coefficient of crosstalk cancel is made equal to the coefficient in the case where the waveform equalization is not performed individually at 13 MHz as the middle frequency band, the gain of the end region in the high frequency band is about 0.67 times the gain of the center region. Consequently, energy of the noise in the high frequency band becomes a value obtained by multiplying the energy of the noise by $(1+2\times 0.67^2)^{1/2}/(1+1+1)^{1/2}$, i.e., about 0.79 so that it is possible to suppress the increase in noise.

Thus, in the case where the optical far-field pattern is subjected to the arithmetic operation by splitting the optical far-field pattern into a plurality of regions in order to cancel the crosstalk, by performing different waveform equalizations for different regions and performing the arithmetic operation using the gain corresponding to the frequency characteristic, it is possible to obtain the effect of suppressing the increase in noise and reducing the crosstalk.

Note that, although the example of the waveform equalizer having the frequency characteristic having the peak of the gain at 13 MHz is shown, the present invention is not limited thereto. It is only necessary to have the peak of the gain in the period that is about 1.3 times to 30 times the period of the optical cutoff as the middle frequency. This corresponds to the range of the normalized frequency of 0.033 to 0.180 in FIG. 7, and is substantially the range in which the OTF amplitude of the second signal PD1 is higher than the OTF amplitude of the third signal PD3. When the peak of the gain of the waveform equalizer is in the range described above, it is possible to suppress the noise and cancel the crosstalk. In this range, as shown in FIG. 9, the amplitude of the OTF of the adjacent track having the coefficient of the crosstalk cancel of 4 can be made smaller than the amplitude of the OTF of the adjacent track having the coefficient of 1.

Thus, the middle frequency is preferably in the band of the signal frequency corresponding to the period that is 1.3 times to 30 times the distance equivalent to optical cutoff Fc. In addition, the high frequency is preferably in the band of the signal frequency corresponding to the period that is shorter than 1.3 times the distance equivalent to optical cutoff Fc.

In addition, the peak of the gain is further preferably in the period that is about 1.5 times to 4 times the period of the optical cutoff. This period corresponds to the range of the normalized frequency of 0.059 to 0.156, and is the frequency in the vicinity of the peak of the OTF amplitude of the second signal PD1 corresponding to the first end region of FIG. 7. In this range, as shown in FIG. 9, the amplitude of the OTF of the adjacent track having the coefficient of the crosstalk cancel of 4 can be made not more than about a half of the amplitude of the OTF of the adjacent track having the coefficient of 1. Thus, the middle frequency is more preferably in the band of the signal frequency corresponding to the period that is 1.5 times to 4 times the distance equivalent to optical cutoff Fc.

Note that the order of the waveform equalizer and the amplifier may be reversed. In addition, although the waveform equalizer and the amplifier are different components, the waveform equalizer may have a function of adjusting all of the gains, and the waveform equalizer and the amplifier may be implemented as one component.

In addition, the number of region split of the split element is not limited to three. For combination with other functions, the split element may be split into four or more regions, light fluxes having passed through four or more regions may be received by four or more light receiving sections. In this case, the four or more regions are divided into a center region group and an end region group, the gain in the high frequency band of the signal from the center region group is made relatively larger than the gain in the middle frequency band, and the gain in the middle frequency band of the signal from the end region group is made relatively larger than the gain in the high frequency band. With this, it is possible to obtain the same effect as that of the present first embodiment. The signal from the region group may be subjected to the waveform equalization individually on a per region basis, or signals obtained by combining the signals from the end region group and the signals from the center region group may be generated and the signals may be subjected to the waveform equalization.

Note that, although the waveform equalizer is configured by the transversal filter using the delay device in the present first embodiment, the present invention is not limited thereto. Instead of configuring the waveform equalizer using hardware, the waveform equalizer may capture a digital signal resulting from A/D conversion and perform the same arithmetic operation as that of the transversal filter using software. Further, although the present first embodiment shows only the example in which the number of taps of the waveform equalizer is three, the number of taps of the waveform equalizer may be four or more. Furthermore, the waveform equalizer may also be configured by a further complicated digital filter.

Figure 12:
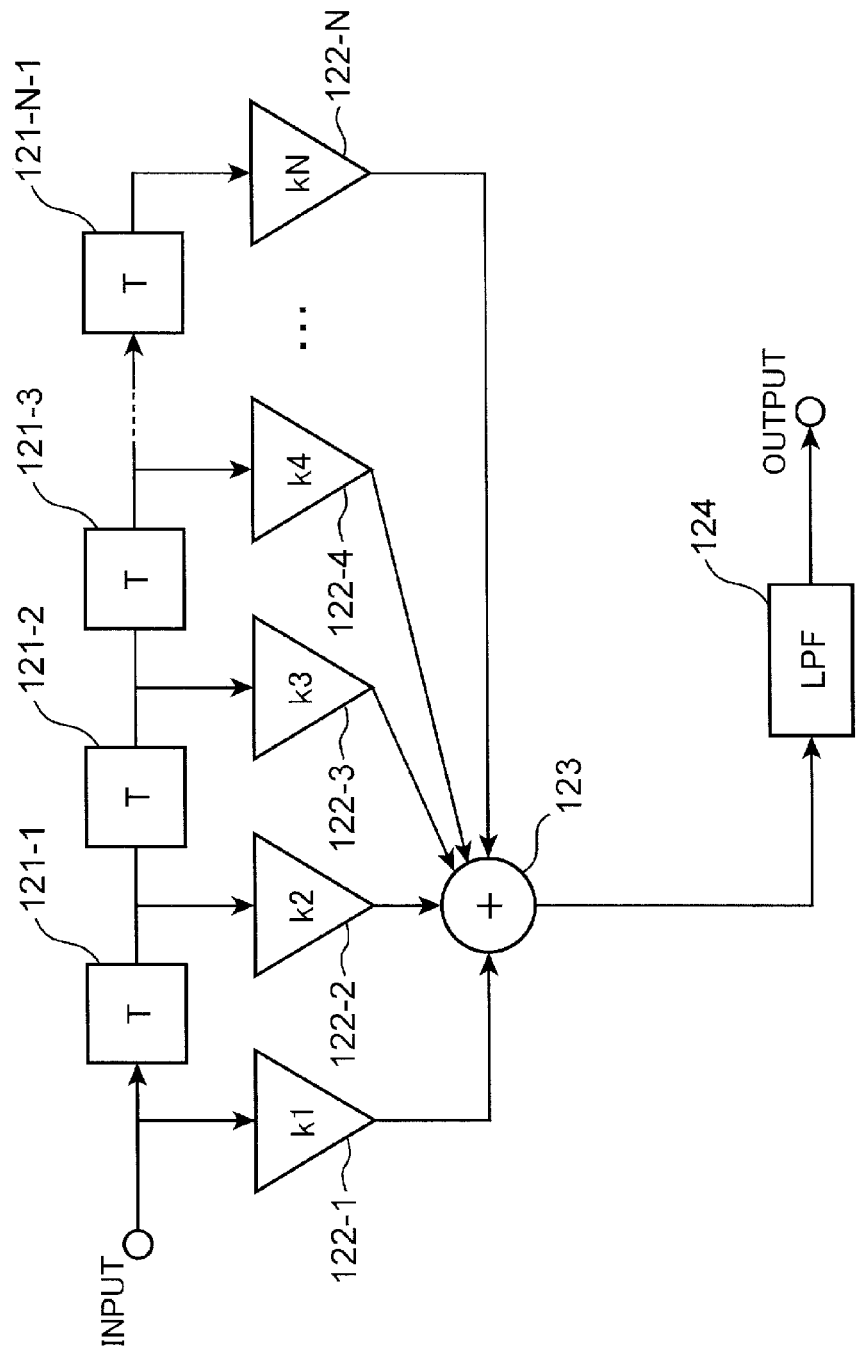
FIG. 12 is a view showing the configuration of the waveform equalizer in a modification of the first embodiment of the present invention.

FIG. 12 is a view showing the configuration of the waveform equalizer in a modification of the first embodiment of the present invention. As shown in FIG. 12, the waveform equalizer may be configured by a transversal filter having N taps. The waveform equalizer shown in FIG. 12 includes N−1 delay devices 121-1 to 121-N−1, N amplifiers 122-1 to 122-N, an adder 123, and a low-pass filter (LPN) 124. Gains k1 to kN of the N amplifiers 122-1 to 122-N are adjusted independently of each other, and N coefficients are thereby realized. Although the optical disc information device shown in FIG. 1 includes the first to third waveform equalizers 80c, 80r, and 80l and the first to third amplifiers 8c, 8r, and 8l as separate components, as shown in FIG. 12, by changing all of the N gains k1 to kN, it is possible to cause the first to third waveform equalizers 80c, 80r, and 80l to perform the functions of the first to third amplifiers 8c, 8r, and 8l. In addition, the same function as that of the waveform equalizer shown in FIG. 12 may be configured by a digital circuit.

Although the present embodiment shows an example in which the characteristic of the second waveform equalizer 80r and the characteristic of the third waveform equalizer 80l are the same, the characteristic of the second waveform equalizer 80r and the characteristic of the third waveform equalizer 80l do not need to be the same. In particular, when radial tilt occurs, by selecting the optimum characteristic for the second and third waveform equalizers 80r and 80l individually, it is possible to suppress the crosstalk with enhanced accuracy.

Figure 13:
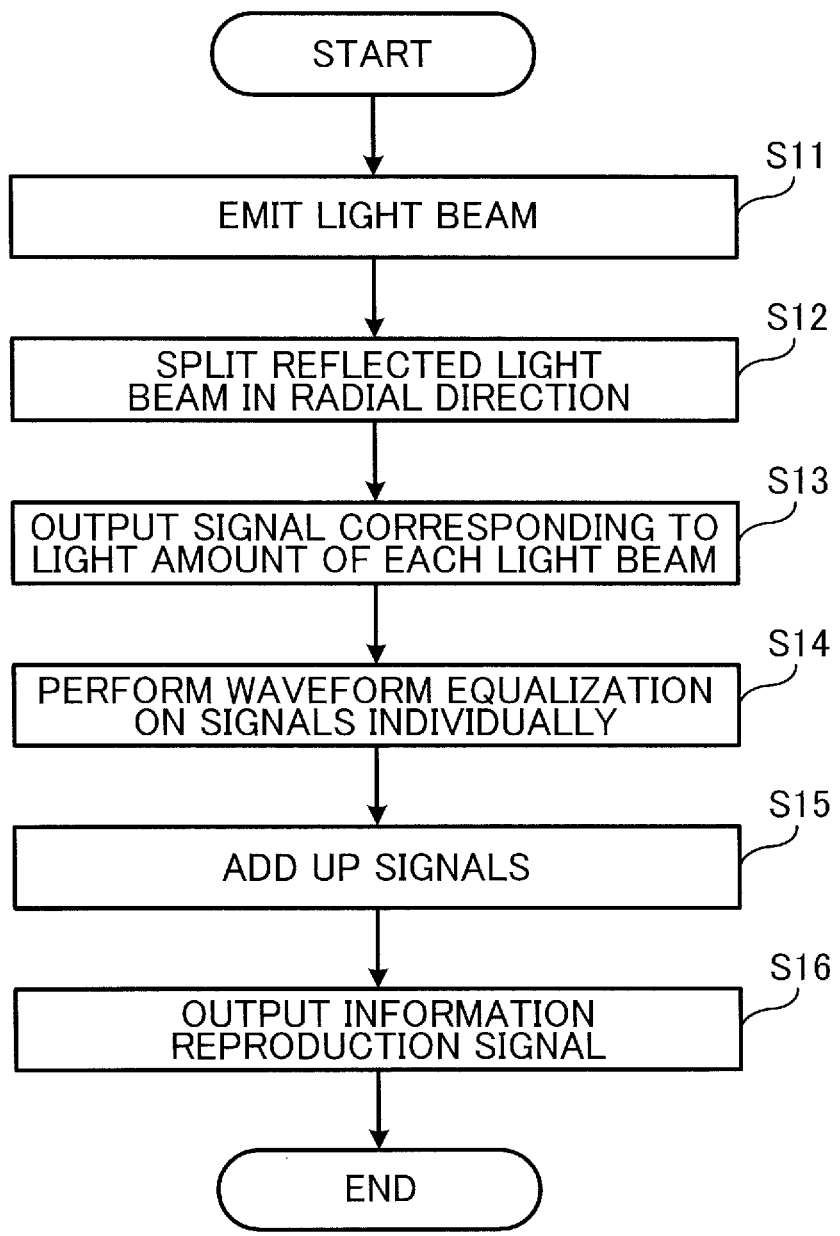
FIG. 13 is a flowchart for explaining a crosstalk reduction method in the first embodiment of the present invention.

A crosstalk reduction method in the present embodiment will be described by using FIG. 13. FIG. 13 is a flowchart for explaining the crosstalk reduction method in the first embodiment of the present invention.

First, the blue semiconductor laser 1 emits the light beam (Step S11). The light beam emitted from the blue semiconductor laser 1 is reflected by the laser mirror 4, and is condensed on the information recording surface of the optical disc 2 by the objective lens 3. The light beam reflected on the information recording surface of the optical disc 2 passes through the laser mirror 4 and the beam splitter 5, and enters the split element 6.

Next, the split element 6 splits the light beam (the light flux) reflected on the optical disc 2 in the radial direction perpendicular to the tangent to the track (Step S12). That is, the split element 6 splits the light flux reflected and diffracted on the optical disc 2 into the first light beam passing through the center region 6c, the second light beam passing through the first end region 6r, and the third light beam passing through the second end region 6l. The first, second, and third light beams obtained by splitting the light flux enter the first light receiving section 7c, the second light receiving section 7r, and the third light receiving section 7l of the photodetector 7.

Next, the photodetector 7 receives the first light beam, the second light beam, and the third light beam obtained by splitting the light flux by the split element 6, and outputs the first signal, the second signal, and the third signal that correspond to the light amounts of the received first, second, and third light beams (Step S13). That is, the first light receiving section 7c receives the first light beam having passed through the center region 6c, and outputs the first signal corresponding to the light amount of the received first light beam. The second light receiving section 7r receives the second light beam having passed through the first end region 6r, and outputs the second signal corresponding to the light amount of the received second light beam. The third light receiving section 7l receives the third light beam having passed through the second end region 6l, and outputs the third signal corresponding to the light amount of the received third light beam.

Next, the first waveform equalizer 80c, the second waveform equalizer 80r, and the third waveform equalizer 80l perform the waveform equalization on the signals individually using the filters having different frequency characteristics (Step S14). The first waveform equalizer 80c, the second waveform equalizer 80r, and the third waveform equalizer 80l give different gains that differ from one frequency to another to the individual signals. That is, the first waveform equalizer 80c gives the gain corresponding to the frequency component of the first signal to the first signal outputted from the first light receiving section 7c of the photodetector 7. The second waveform equalizer 80r gives the gain different from the gain of the first signal that corresponds to the frequency component of the second signal to the second signal outputted from the second light receiving section 7r of the photodetector 7. The third waveform equalizer 80l gives the gain different from the gains of the first and second signals that corresponds to the frequency component of the third signal to the third signal outputted from the third light receiving section 7*l* of the photodetector 7.

The first signal, the second signal, and the third signal having been subjected to the waveform equalization by the first waveform equalizer 80*c*, the second waveform equalizer 80*r*, and the third waveform equalizer 80*l* are amplified by the first amplifier 8*c*, the second amplifier 8*r*, and the third amplifier 8*l*, and are inputted to the adder 9.

Next, the adder 9 adds up the first signal, the second signal, and the third signal outputted from the first amplifier 8*c*, the second amplifier 8*r*, and the third amplifier 8*l* (Step S15). The arithmetic operation for crosstalk cancel is performed by the adder 9.

Next, the reproduction signal processing section 10 performs signal processing or error correction on the signal (the RF signal) obtained by the addition by the adder 9, and outputs the signal as the information reproduction signal (Step S16).

Herein, the electric signals obtained in Step S13 (the first signal, the second signal, and the third signal) include an information item on the main track and an information item on the adjacent track. A ratio Xm of the information item on the adjacent track relative to the information item on the main track that are included in the electric signal (the first signal) corresponding to the center region 6*c* is different from ratios Xs1 and Xs2 of the information items on the adjacent track relative to the information items on the main track that are included in the electric signals (the second signal and the third signal) corresponding to the end regions 6*r* and 6*l*. In addition, the ratio among the gains of a plurality of the waveform equalizers used in Step S14 (the first waveform equalizer 80*c*, the second waveform equalizer 80*r*, and the third waveform equalizer 80*l*) is determined so as to cancel the information items on the adjacent track by using differences between the ratio Xm and the ratios Xs1 and Xs2 in each frequency component.

With these Steps, it is possible to obtain the information reproduction signal in which the crosstalk is reduced and it becomes possible to reproduce information at a low error rate.

In the first embodiment, the OTF of the main track and the OTF of the adjacent track have the characteristics shown in FIGS. 4 and 7. From these, when the ratio of the signal component of the adjacent track relative to the signal component of the main track in each split region (crosstalk ratio) is determined, the ratio thereof displays a characteristic shown in FIG. 14.

Figure 14:
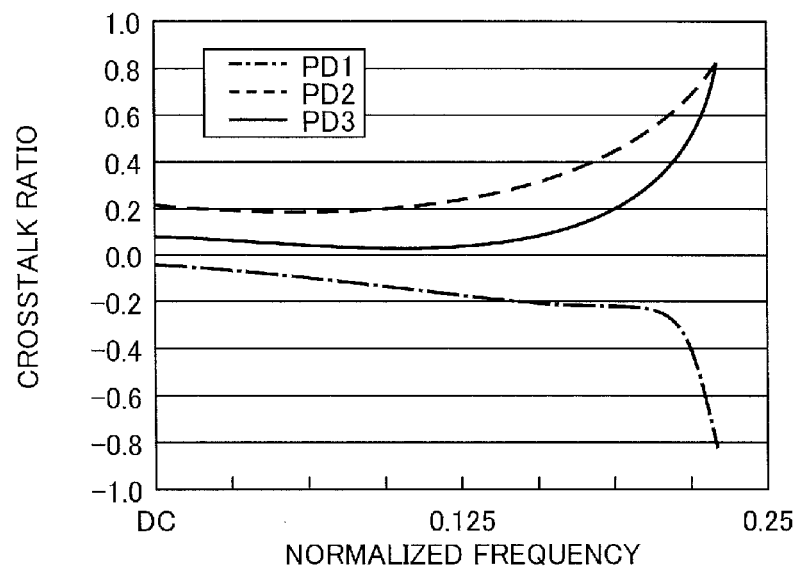
FIG. 14 is a view showing a crosstalk ratio among a first signal, a second signal, and a third signal.

FIG. 14 is a view showing the crosstalk ratio of each of the first signal, the second signal, and the third signal. The ratio Xm of the information item on the adjacent track (one side) relative to the information item on the main track that are included in the first signal PD2 obtained from the first light receiving section 7*c* corresponding to the center region 6*c* is indicated by a broken line, the ratio Xs1 of the information item on the adjacent track (one side) relative to the information item on the main track that are included in the second signal PD1 obtained from the second light receiving section 7*r* corresponding to the first end region 6*r* is indicated by a one-dot chain line, and the ratio Xs2 of the information item on the adjacent track (one side) relative to the information item on the main track that are included in the third signal PD3 obtained from the third light receiving section 7*l* corresponding to the second end region 6*l* is indicated by a solid line.

In the second signal PD1, since the polarity of the main track is different from the polarity of the adjacent track, the ratio Xs1 of the second signal PD1 denotes a ratio including a coincidence. Based on these, an arithmetic operation method for minimizing the crosstalk will be described. When signals of the main track of the first signal PD2, the second signal PD1, and the third signal PD3 are assumed to be S1, S2, and S3, the ratios of the waveform equalization coefficients of the signals corresponding to the end regions relative to the waveform equalization coefficient of the signal corresponding to the center region are assumed to be k1 and k3, the crosstalk from the right adjacent track is represented by a numerical subscript R, and the crosstalk from the left adjacent track is represented by a numerical subscript L, a crosstalk amount XR from the right adjacent track after the arithmetic operation is represented by the following Expression (1), and a crosstalk amount XL from the left adjacent track after the arithmetic operation is represented by the following Expression (2).

$$XR \propto k1 \cdot Xs1R \cdot S1 + XmR \cdot S2 + k3 \cdot Xs2R \cdot S3 \tag{1}$$

$$XL \propto k1 \cdot Xs1L \cdot S1 + XmL \cdot S2 + k3 \cdot Xs2L \cdot S3 \tag{2}$$

In above two Expressions (1) and (2), when XR=0 and XL=0 are satisfied, by solving the two equations Expressions (1) and (2), it is possible to determine the waveform equalization coefficient ratios k1 and k3. A signal S0 of the main track after the arithmetic operation is represented by the following Expression (3). If the ratio Xm and the ratios Xs1 and Xs2 do not have the same value, the signal S0 of the main track after the arithmetic operation does not become 0.

$$S0 = k1 \cdot S1 + S2 + k3 \cdot S3 \tag{3}$$

On the other hand, in the case where the ratio Xm and the ratios Xs1 and Xs2 have the same value, the signal S0 of the main track after the arithmetic operation represented by above Expression (3) becomes 0. The reproduction signal of the main track also becomes 0 with the arithmetic operation for reducing the crosstalk. To cope with this, it is necessary to determine the split regions of the split element such that the ratio Xm and the ratios Xs1 and Xs2 do not have the same value.

Herein, when it is assumed that the second light receiving section 7*r* and the third light receiving section 7*l* are symmetrical with each other, and the crosstalk of the right adjacent track and the crosstalk of the left adjacent track are symmetrical with each other, Xs1R=Xs2L, Xs2R=Xs1L, XmR=XmL, and S1=S3 are satisfied, solutions of the waveform equalization coefficient ratios k1 and k3 can be easily obtained as shown in the following Expression (4).

$$k1 = k3 = -(XmR \cdot S2)/\{(Xs1R + Xs2R) \cdot S1\} \tag{4}$$

Figure 15:
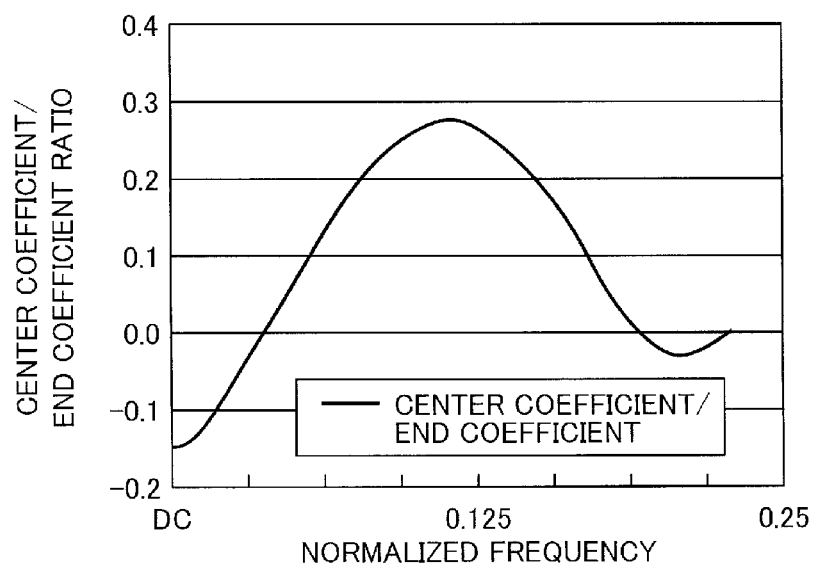
FIG. 15 is a view showing an example of a reciprocal of a waveform equalization coefficient ratio k1 (a center coefficient/an end coefficient ratio).

FIG. 15 shows an example of the reciprocal of the waveform equalization coefficient ratio k1 (center coefficient/end coefficient ratio) determined by the above method. Thus, it is possible to determine the coefficient ratio from the crosstalk amount.

Herein, although the example in which the light receiving sections are symmetrical with each other and the crosstalks are symmetrical with each other is shown, in the case where radial tilt, lens shift, or off-track occurs, the light receiving sections become asymmetrical with each other, and the crosstalks become asymmetrical with each other. Even in this case, the two equations of Expression (1) and Expression (2) in which the crosstalk mounts XR and XL are 0 have two Expressions and two unknowns, and hence it is possible to solve the equations and determine the waveform equalization coefficient ratios k1 and k3. By performing the waveform equalization using the coefficient ratios k1 and k3, the crosstalk amounts from the adjacent tracks assumed in Expression (1) and Expression (2) can be set to 0.

The ratio of the crosstalk from the adjacent track differs from one frequency to another. Consequently, in order to remove the crosstalk in the entire frequency band, it is necessary to optimize the waveform equalization coefficient ratio for each of the frequencies. In addition, in the case where the reproduction signal processing section 10 reproduces information from the reproduction signal by a PRML method, it is necessary to adjust the frequency characteristic of the signal of the main track such that the ideal reproduction frequency characteristic is obtained. By providing N waveform equalizers for N signals obtained by splitting, (N−1) degrees of freedom are used to determine the ratio such that the crosstalk is canceled, and the remaining one degree of freedom is used to adjust the entire frequencies.

The PRML method and a Viterbi decoding method are applied to the signal of the main track in order to reproduce information recorded in the optical disc. In order to properly perform the decoding, it is necessary to correct the frequency characteristic of the signal such that the waveform of the signal matches a partial response waveform (PR waveform) assumed in the decoding method. One degree of freedom remaining in the waveform equalizer is used for the correction. Specifically, the waveform equalization coefficient for performing the waveform equalization on the signal S0 of Expression (3) to cause the signal S0 to have the ideal PR waveform may be appropriately determined.

Figure 16:
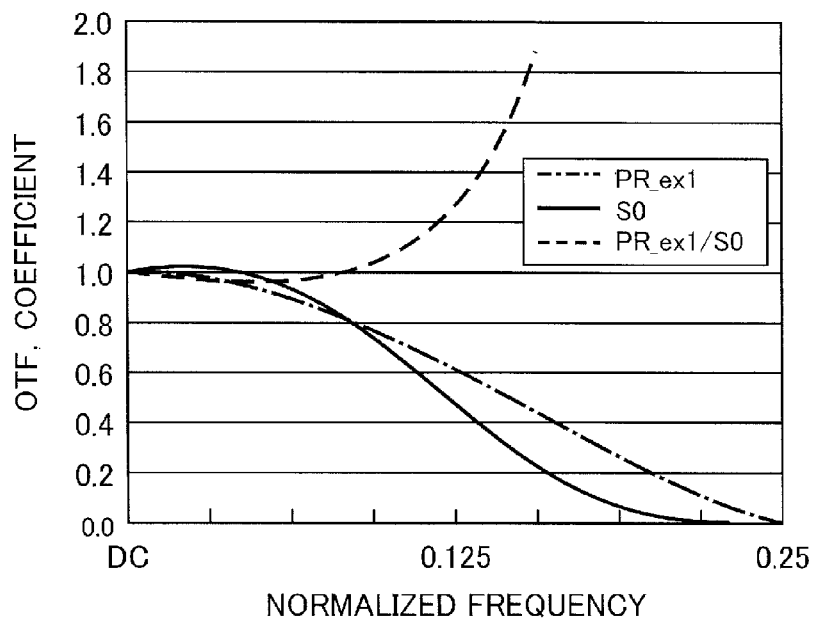
FIG. 16 is a view showing a PR waveform when the case where a frequency of a signal reaches a normalized frequency of 0.25 is assumed.
Figure 17:
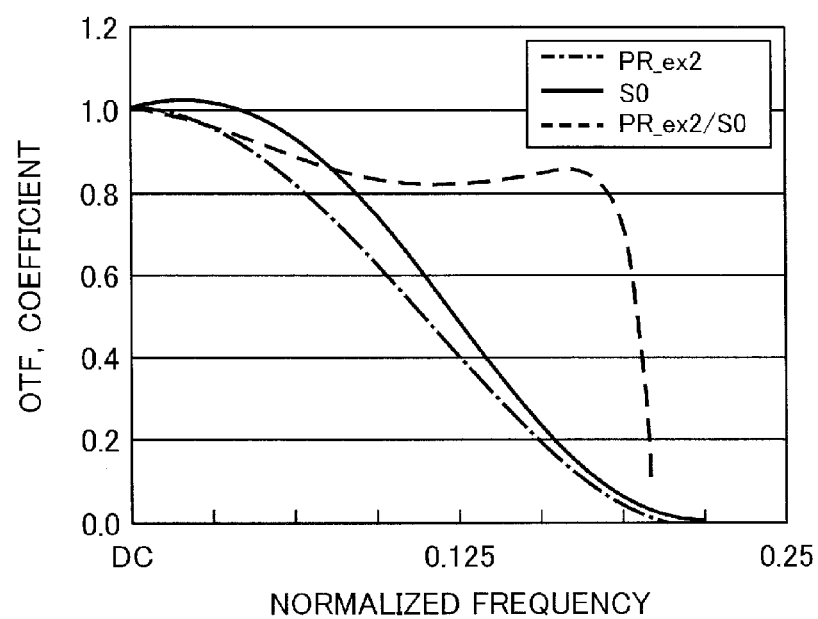
FIG. 17 is a view showing the PR waveform when the case where the frequency of the signal reaches a frequency lower than that of a signal S0 of the present first embodiment is assumed.

FIG. 16 and FIG. 17 show two examples of the PR waveform. FIG. 16 is a view showing the PR waveform when the case where the frequency of the signal reaches the normalized frequency of 0.25 is assumed. In the signal S0 using the parameter shown in the present first embodiment, the optical cutoff frequency is smaller than the normalized frequency of 0.25. Consequently, the required waveform equalization coefficient (PR_ex1/S0) is increased in the high frequency band and diverges at the cutoff frequency or higher, as indicated by the broken line in FIG. 16.

On the other hand, FIG. 17 is a view showing the PR waveform when the case where the frequency of the signal is lower than the frequency of the signal S0 of the present first embodiment is assumed. In this case, the waveform equalization coefficient (PR_ex2/S0) becomes 0 at a given frequency or higher, as indicated by the broken line in FIG. 17. Thus, it is possible to determine the ideal frequency characteristic from the PR waveform to determine the proper frequency characteristic of the waveform equalization coefficient.

Figure 18:
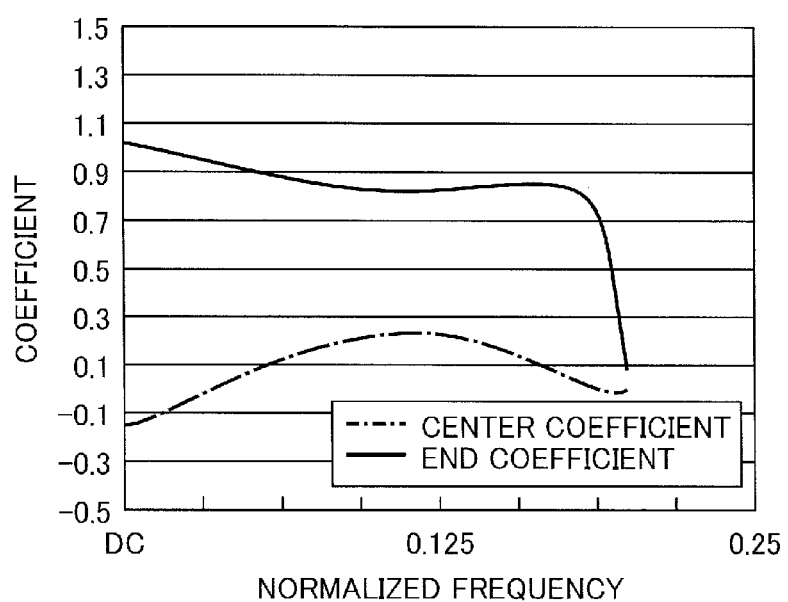
FIG. 18 is a view showing a waveform equalization coefficient calculated in the present first embodiment.

With the assumption shown in FIG. 17 and the waveform equalization coefficient ratio obtained in FIG. 15, it is possible to determine the frequency characteristic of the waveform equalization coefficient applied to the first signal corresponding to the center region and the frequency characteristic of the waveform equalization coefficient applied to each of the second signal and the third signal corresponding to the end regions. FIG. 18 is a view showing the waveform equalization coefficients calculated in the present first embodiment. In FIG. 18, the one-dot chain line indicates the frequency characteristic of the waveform equalization coefficient applied to the first signal corresponding to the center region, and the solid line indicates the frequency characteristic of the waveform equalization coefficient applied to each of the second and third signals corresponding to the end regions. Thus, it is possible to reduce the crosstalk amount and cause the frequency characteristic of the reproduction signal to match the ideal frequency characteristic of the PR system.

Thus, by using that the signal outputted from the photodetector 7 includes both of the information item on the main track and the information item on the adjacent track, the individual split regions of the split element 6 are determined such that the ratio Xm of the information item on the adjacent track relative to the information item on the main track that are included in the first signal from the first light receiving section corresponding to the center region is different from the ratios Xs1 and Xs2 of the information items on the adjacent track relative to the information items on the main track that are included in the second and third signals from the second and third light receiving sections corresponding to the first and second end regions. With this, the ratio among the gains of the plurality of the waveform equalizers can be determined so as to cancel the information items on the adjacent tracks by using the differences between the ratio Xm and the ratios Xs1 and Xs2 in each frequency component.

Further, by using another degree of freedom of the gain of the waveform equalizer, the coefficients (gains) of the plurality of the waveform equalizers (the first waveform equalizer 80*c*, the second waveform equalizer 80*r*, and the third waveform equalizer 80*l*) are determined such that the reproduction frequency characteristic of the information item on the main track matches the ideal frequency characteristic assumed in the reproduction signal processing section 10. With the above arrangement, even in the case where the information track pitch is narrow, it is possible to obtain the ideal reproduction signal waveform having sufficiently small crosstalk, and it becomes possible to reproduce information at a low error rate.

In addition, the ratio of the gain of the second waveform equalizer 80*r* relative to the gain of the first waveform equalizer 80*c* is made proportional to the reciprocal of the ratio between the ratio Xm and the ratio Xs1 in each frequency component. Further, the ratio of the gain of the third waveform equalizer 80*l* relative to the gain of the first waveform equalizer 80*c* is made proportional to the reciprocal of the ratio between the ratio Xm and the ratio Xs2 in each frequency component. With this, it is possible to cancel information recorded on the adjacent tracks.

The calculation above has been carried out based on the optical conditions that the numerical aperture NA is 0.85, the wavelength $\lambda$ is 0.405 μm, and the pitch Tp of the information track is 0.24 μm. From Fc=$\lambda$(2·NA), the optical cutoff distance Fc in this optical system is 0.238 μm, and the optical cutoff distance Fc is substantially equal to the pitch Tp of the information track. In consideration of variations in the wavelength of the normal laser light, the optical cutoff distance Fc is 0.241 μm when the wavelength $\lambda$, is 0.410 μm, and the optical cutoff distance Fc is 0.244 μm when the wavelength $\lambda$ is 0.415 μm. Under such conditions, as shown in FIG. 14, the absolute value of the ratio of the information item on the adjacent track relative to the information item on the main track reaches about 0.2 to 0.8.

In order to virtually obtain the crosstalk reduction effect shown in the present first embodiment, the ratio of the information item on the adjacent track needs to be high. When the ratio of the information item on the adjacent track is small, the effect of reducing the crosstalk amount that is small from the beginning is small as compared with an increase in noise or the like by the arithmetic operation for the correction, and the practical effect cannot be obtained. Consequently, in order to obtain the effect in the present first embodiment, it is better for the pitch Tp of the information track to be substantially equal to or smaller than the optical cutoff distance Fc of the optical system.

Thus, when the wavelength of the light flux is represented by $\lambda$, and the numeral aperture of the objective lens is represented by NA, the pitch Tp of the information track is preferably smaller than the distance equivalent to optical cutoff Fc=λ/(2·NA).

Herein, other split patterns of the split element will be described.

Figure 19:
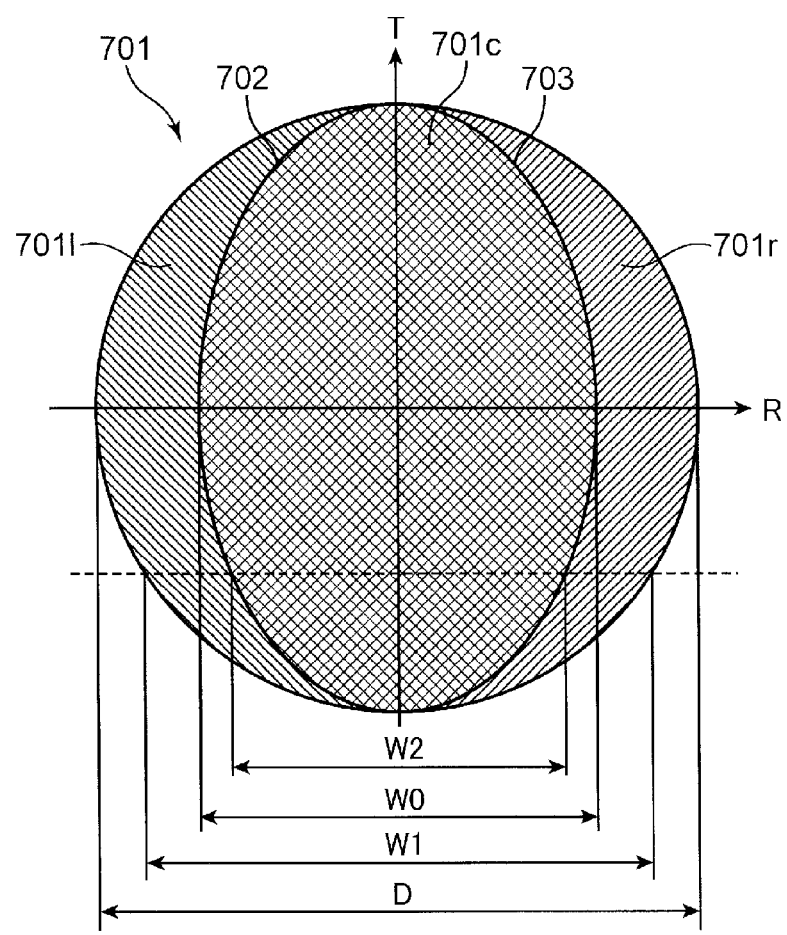
FIG. 19 is a view showing an example of region split of a split element in a first modification of the first embodiment of the present invention.

FIG. 19 is a view showing an example of the region split of the split element in a first modification of the first embodiment of the present invention. The optical system is the same as that shown in the first embodiment, and a split element 70*l* is used in place of the split element 6.

The split element 701 is split into a first end region 701*r*, a center region 701*c*, and a second end region 701*l* by a splitting line 702 and a splitting line 703. Each of the splitting lines 702 and 703 is an outwardly convex curve. A width of the center region 701*c* in a direction perpendicular to the tangent to the information track is gradually reduced from the center of the split element 701 toward the end of the split element 701 in a direction of the tangent to the information track. At each position in a tangential direction (T-axis direction) as the direction of the tangent to the track, the ratio among the widths of the first end region 701*r*, the center region 701*c*, and the second end region 701*l* is constant. That is, the positions of the splitting lines 702 and 703 are determined such that a ratio W0/D of a width W0 of the center region 701*c* relative to a diameter D of the light beam at the center of the optical axis in the tangential direction T is equal to a ratio W2/W1 of a width W2 of the center region 701*c* relative to a width W1 of the contour of the light beam at any position in the tangential direction T.

When such a splitting pattern is used, the frequency characteristic of the signal obtained from the light beam having passed through the first end region 701*r* or the second end region 701*l* has a high frequency component. As a result, the waveform equalization coefficient becomes less likely to diverge even in the high frequency component. Consequently, it becomes easy to cause the signal after the waveform equalization to have the ideal PR waveform and reduce the crosstalk, and it becomes possible to reproduce information at a low error rate.

Figure 20:
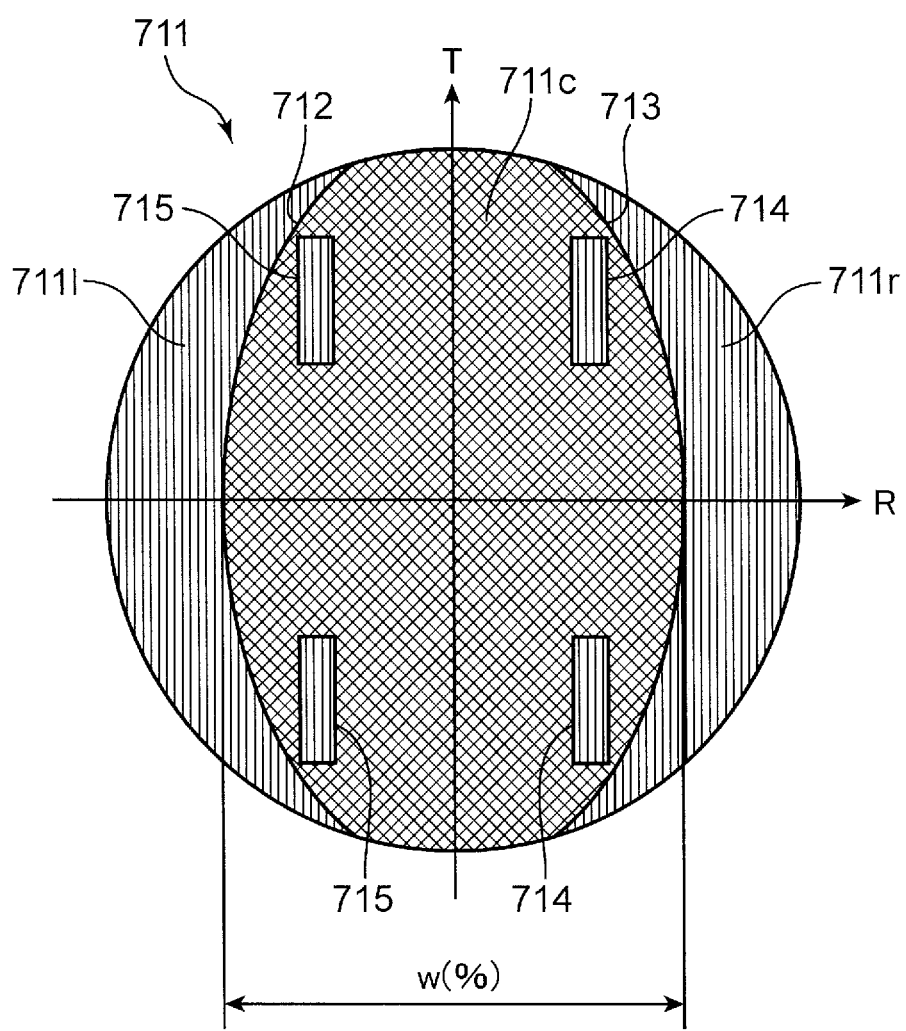
FIG. 20 is a view showing an example of the region split of the split element in a second modification of the first embodiment of the present invention.

FIG. 20 is a view showing an example of the region split of the split element in a second modification of the first embodiment of the present invention. The optical system is the same as that shown in the first embodiment, and a split element 711 is used in place of the split element 6.

The split element 711 is split into a first end region 711*r*, a center region 711*c*, and a second end region 711*l* by a splitting line 712 and a splitting line 713. Each of the splitting lines 712 and 713 is an outwardly convex curve. The first end region 711*r* and the second end region 711*l* are present even at the end of the split element 711 in the tangential direction (T-axis direction) as the direction of the tangent to the track. Further, inside the center region 711*c*, two first island-like regions 714 and two second island-like regions 715 are formed.

The split element 711 includes the first island-like regions 714 that are formed into an island-like shape on the center region 711*c* in the vicinity of the first end region 711*r*, and the second island-like regions 715 that are formed into the island-like shape on the center region 711*c* in the vicinity of the second end region 711*l*. A signal obtained from a light flux having passed through each first island-like region 714 is outputted together with the second signal obtained from the second light flux having passed through the first end region 711*r*. A signal obtained from a light flux having passed through each second island-like region 715 is outputted together with the third signal obtained from the third light flux having passed through the second end region 711*l*.

The first island-like region 714 is formed in the vicinity of the splitting line 713 that separates the first end region 711*r* and the center region 711*c*. The second island-like region 715 is formed in the vicinity of the splitting line 712 that separates the center region 711*c* and the second end region 711*l*. The first island-like region 714 is detected as the same region as the first end region 711*r*, and the second island-like region 715 is detected as the same region as the second end region 711*l*. The first island-like region 714 has the same diffraction structure as that of the first end region 711*r*, and the second island-like region 715 has the same diffraction structure as that of the second end region 711*l*.

With the presence of the first island-like region 714 and the second island-like region 715, even in the case where one of the first end region 711*r* and the second end region 711*l* is reduced due to lens shift, it is possible to alleviate the degree of the change. In addition, also in the case where radial tilt or the like occurs, it is possible to alleviate the change and increase the margin of the crosstalk reduction effect. With this, it becomes possible to reproduce information at a low error rate.

Figure 21:
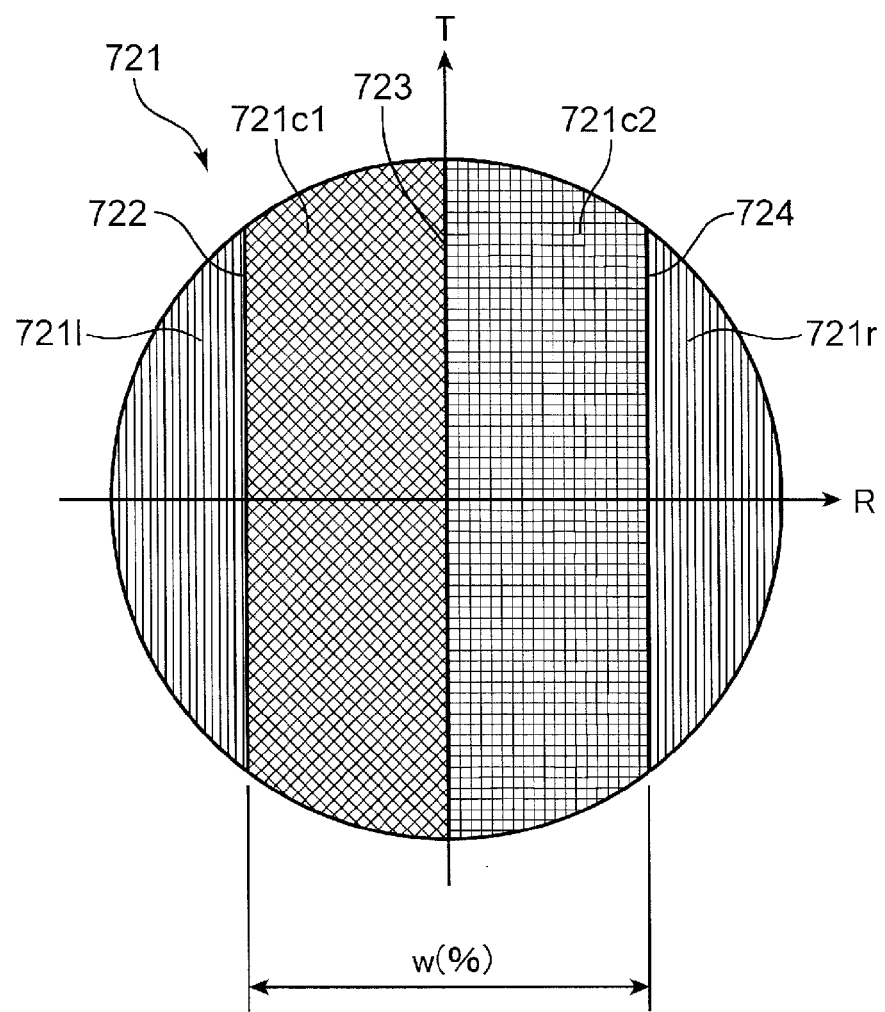
FIG. 21 is a view showing an example of the region split of the split element in a third modification of the first embodiment of the present invention.

FIG. 21 is a view showing an example of the region split of the split element in a third modification of the first embodiment of the present invention. The optical system is the same as that shown in the first embodiment, and a split element 721 is used in place of the split element 6.

The split element 721 is split into a first end region 721*r*, a first center region 721*c*1, a second center region 721*c*2, and a second end region 721*l* by three splitting lines 722, 723, and 724. The splitting lines 722, 723, and 724 are straight lines parallel with the tangential direction (T-axis direction) as the direction of the tangent to the track. That is, the center region 6*c* shown in FIG. 3 is further split into two regions (the first center region 721*c*1 and the second center region 721*c*2) by the splitting line 723 parallel with the tangent to the information track.

Four light beams obtained by splitting by the split element 721 are received by a photodetector having four light receiving section. The four light receiving sections convert the received light beams to electric signals corresponding to the light amounts. The four signals outputted from the four light receiving sections are subjected to waveform equalization by four waveform equalizers as four frequency filters. The four waveform equalizers perform the waveform equalization on the signals such that the crosstalk from the adjacent track is minimized and the signal from the main track has the predetermined frequency characteristic of the PR waveform.

By using the four waveform equalizers, it is possible to provide a condition that minimizes the crosstalk from not only the right and left adjacent tracks but also outer adjacent tracks adjacent to the right and left adjacent tracks. Further, even in the case where the split positions of the regions of the split element 721 become asymmetrical in the radial direction due to lens shift or radial tilt, it is possible to suppress a reduction in crosstalk reduction capability by appropriately changing the coefficients of the four waveform equalizers. With this, the range in which the crosstalk is reduced is increased, and it becomes possible to reproduce information at a low error rate.

Note that the configuration shown in the present first embodiment may be used not only in the optical disc information device that records information in the disc-like optical information medium (the optical disc 2) or reproduce the information recorded therein but also in an optical card information device that records information in a card-like optical information medium (an optical card) or reproduces the information recorded therein or an optical tape information device that records information in a tape-like optical information medium (an optical tape) or reproduces the information recorded therein.

Note that the present first embodiment shows the example in which the groove-like track is provided on the surface on which the information track is also provided but, as in a multi-layer optical disc having a tracking layer separately, the surface having the groove-like track for performing tracking control and the surface having the information track on which information is recorded may be provided in different layers. In this case as well, when the pitch of the information track on which information is recorded is substantially equal to or smaller than the optical cutoff distance Fc (Fc=λ/(2·NA)) of the optical system, the crosstalk from the adjacent track is increased. However, by using the optical disc information device having the configuration shown in the present first embodiment, it is possible to reduce the crosstalk.

Second Embodiment

A second embodiment shows an example in which the waveform equalizer is configured integrally with a light receiving element with an amplifier. Note that, in the second embodiment, components which are the same as those in the first embodiment are designated by the same reference numerals, and the detailed description thereof will be omitted.

Figure 22:
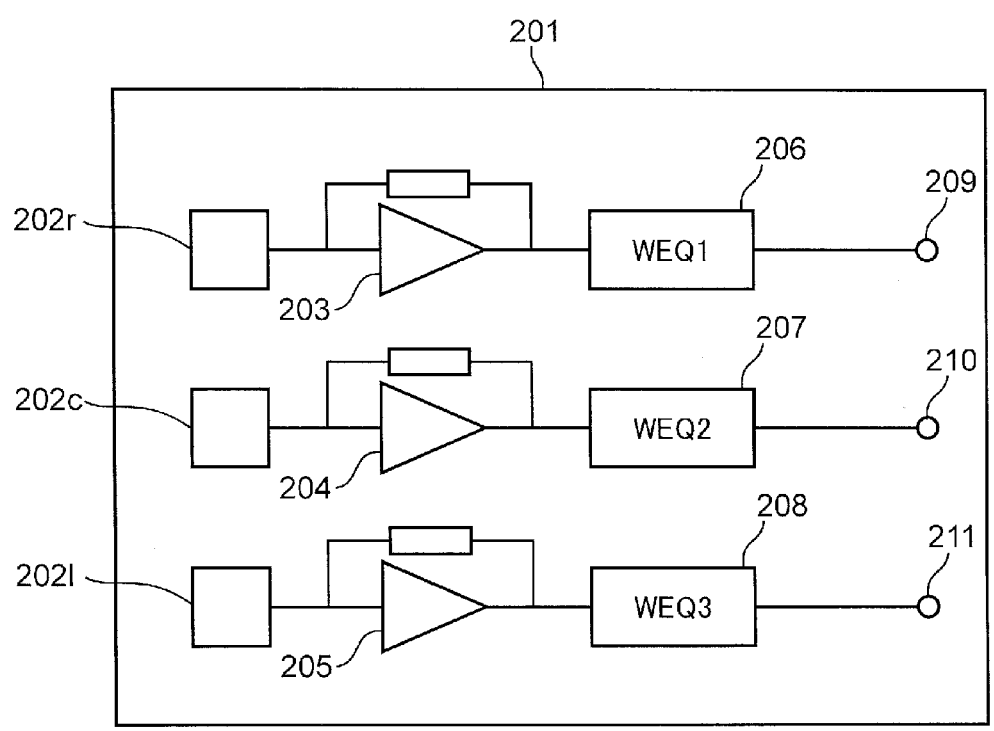
FIG. 22 is a view showing an example of a configuration of a light receiving element with an amplifier in a second embodiment of the present invention.

FIG. 22 is a view showing an example of the configuration of a light receiving element with an amplifier 201 in the second embodiment of the present invention. The light receiving element with an amplifier 201 includes a first light receiving section 202r, a second light receiving section 202c, a third light receiving section 2021, a first I-V amplifier 203, a second I-V amplifier 204, a third I-V amplifier 205, a first waveform equalizer 206, a second waveform equalizer 207, and a third waveform equalizer 208.

The first I-V amplifier 203, the second I-V amplifier 204, and the third I-V amplifier 205 convert currents from the first light receiving section 202r, the second light receiving section 202c, and the third light receiving section 2021 to voltages. Upon reception of output signals from the first I-V amplifier 203, the second I-V amplifier 204, and the third I-V amplifier 205, the first waveform equalizer 206, the second waveform equalizer 207, and the third waveform equalizer 208 give gains that differ from one frequency to another to the output signals. Outputs of the first waveform equalizer 206, the second waveform equalizer 207, and the third waveform equalizer 208 are outputted from output terminals 209, 210, and 211.

In this case as well, it is possible to implement the characteristic described in the first embodiment by changing the characteristic of the waveform equalization in accordance with each of the regions that split the far field. The first I-V amplifier 203, the second I-V amplifier 204, the third I-V amplifier 205, the first waveform equalizer 206, the second waveform equalizer 207, and the third waveform equalizer 208 are disposed on the same light receiving element with an amplifier 201, and it is thereby possible to prevent the mixing of the noise.

Figure 23:
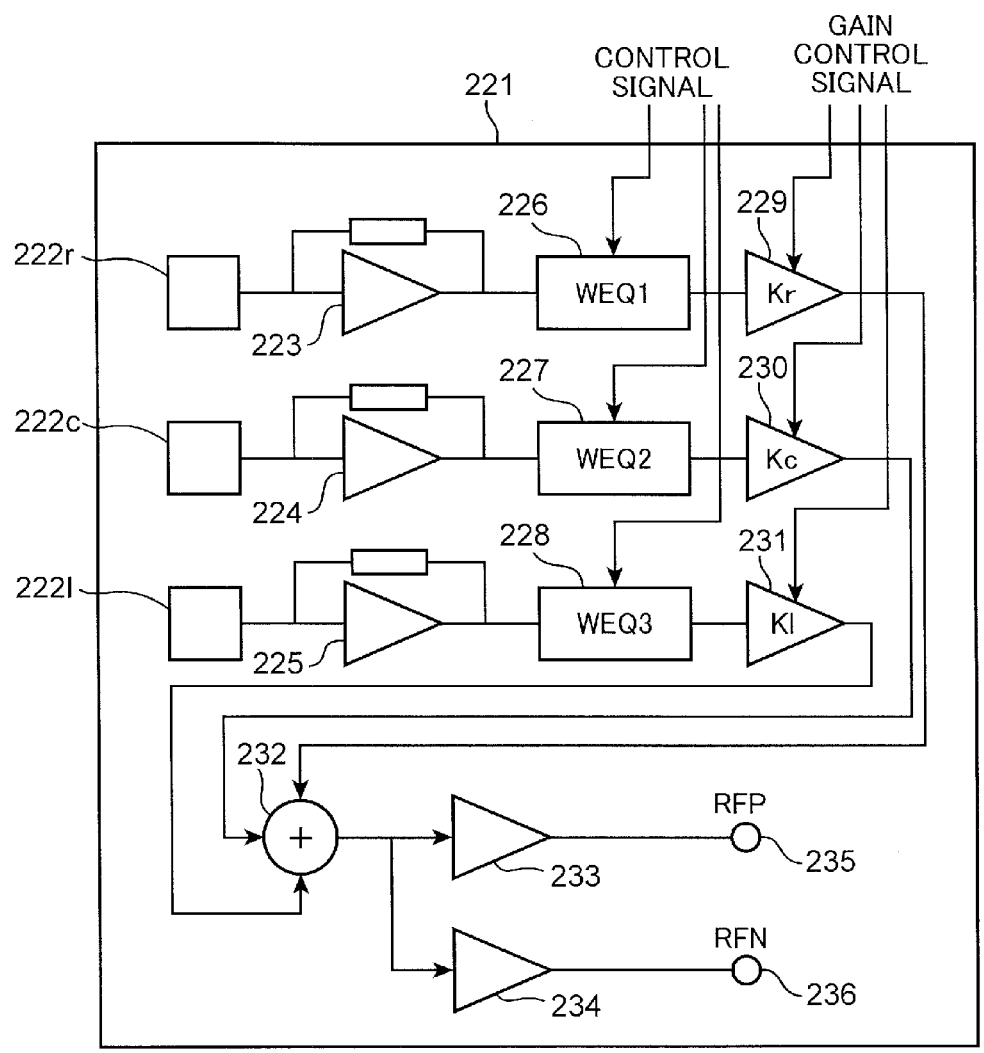
FIG. 23 is a view showing an example of the configuration of the light receiving element with an amplifier in a modification of the second embodiment of the present invention.

FIG. 23 is a view showing an example of the configuration of a light receiving element with an amplifier 221 in a modification of the second embodiment of the present invention. In the modification of the second embodiment, the light receiving element with an amplifier 221 includes not only the waveform equalizer but also a variable gain amplifier. The light receiving element with an amplifier 221 includes a first light receiving section 222r, a second light receiving section 222c, a third light receiving section 2221, a first I-V amplifier 223, a second I-V amplifier 224, a third I-V amplifier 225, a first waveform equalizer 226, a second waveform equalizer 227, a third waveform equalizer 228, a first variable gain amplification circuit 229, a second variable gain amplification circuit 230, a third variable gain amplification circuit 231, an adder 232, a non-inverting amplification circuit 233, an inverting amplification circuit 234, a terminal 235, and a terminal 236.

Gain control signals are inputted to the first variable gain amplification circuit 229, the second variable gain amplification circuit 230, and the third variable gain amplification circuit 231 from the outside, and the gains of the first variable gain amplification circuit 229, the second variable gain amplification circuit 230, and the third variable gain amplification circuit 231 are controlled. In addition, control signals are inputted to the first waveform equalizer 226, the second waveform equalizer 227, and the third waveform equalizer 228 from the outside, and the characteristics of the first waveform equalizer 226, the second waveform equalizer 227, and the third waveform equalizer 228 are controlled.

The first I-V amplifier 223, the second I-V amplifier 224, and the third I-V amplifier 225 convert currents from the first light receiving section 222r, the second light receiving section 222c, and the third light receiving section 2221 to voltages. Upon reception of output signals from the first I-V amplifier 223, the second I-V amplifier 224, and the third I-V amplifier 225, the first waveform equalizer 226, the second waveform equalizer 227, and the third waveform equalizer 228 give gains that differ from one frequency to another to the output signals. Upon reception of output signals from the first waveform equalizer 226, the second waveform equalizer 227, and the third waveform equalizer 228, the first variable gain amplification circuit 229, the second variable gain amplification circuit 230, and the third variable gain amplification circuit 231 amplify the output signals. Output signals from the first variable gain amplification circuit 229, the second variable gain amplification circuit 230, and the third variable gain amplification circuit 231 are inputted to the adder 232.

The adder 232 adds up the output signals of the first variable gain amplification circuit 229, the second variable gain amplification circuit 230, and the third variable gain amplification circuit 231. An output signal from the adder 232 is inputted to the non-inverting amplification circuit 233 and the inverting amplification circuit 234. The non-inverting amplification circuit 233 generates a signal having the same polarity as that of the input signal, while the inverting amplification circuit 234 generates a signal having a polarity opposite to that of the input signal. An output signal of the non-inverting amplification circuit 233 is outputted from the terminal 235 as a positive-polarity signal (RFP), while an output signal from the inverting amplification circuit 234 is outputted from the terminal 236 as a negative-polarity signal (RFN). Signals outputted from the terminal 235 and the terminal 236 are inputted to the reproduction signal processing section 10.

The control signal for controlling the parameter of each waveform equalizer and the gain control signal inputted to each variable gain amplification circuit are generated by the tracking switcher 13 of FIG. 1, the tilt detector 14 thereof, or a control circuit (not shown). The control circuit may detect the RPM of the optical disc, a reproduction radius position, the type of the optical disc, and a reproduction layer position, and may generate the control signal and the gain control signal in which detected information is reflected.

It is possible to reduce the distance of a signal line from the light receiving section to the waveform equalizer or the distance of the signal line from the light receiving section to the adder with the light receiving element with an amplifier 201 or 221 shown in the present second embodiment, and hence it is possible to equalize the delay times of the individual signals and reduce variations in the timing of the arithmetic operation. With this, it is possible to reduce the rate of occurrence of an error.

Third Embodiment

A computer according to a third embodiment includes the optical disc information device according to the first embodiment or the second embodiment.

Figure 24:
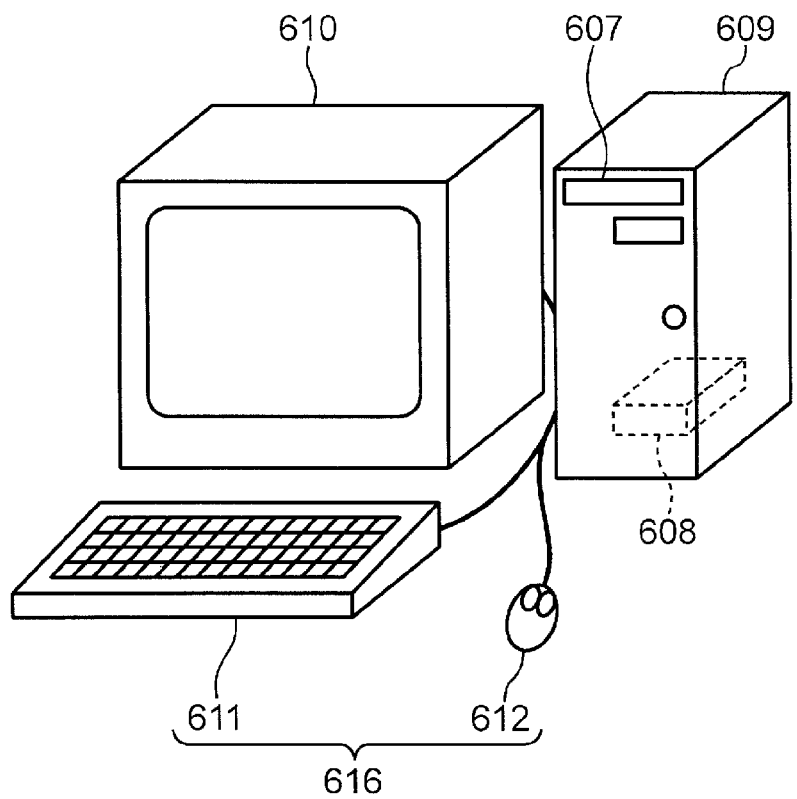
FIG. 24 is a perspective view showing a schematic configuration of a computer according to a third embodiment of the present invention.

FIG. 24 is a perspective view showing the schematic configuration of the computer according to the third embodiment of the present invention.

A computer 609 shown in FIG. 24 includes an optical disc information device 607 according to the first embodiment or the second embodiment, an input device 616 such as a keyboard 611 or a mouse 612 for inputting information, an arithmetic unit 608 such as a central processing unit (CPU) that performs an arithmetic operation based on information inputted from the input device 616 and information read from the optical disc information device 607, and an output device 610 such as a cathode-ray tube or a liquid crystal display device that displays information such as the result of the arithmetic operation of the arithmetic unit 608 or the like.

The computer 609 according to the present third embodiment includes the optical disc information device 607 according to the first embodiment or the second embodiment, and is capable of reducing the crosstalk without increasing the noise even in the case of the optical disc having a narrow track pitch, and hence the computer 609 can reproduce information recorded at a high density at a low error rate, and can be used in a wide variety of applications.

In addition, the computer 609 may be provided with a wired or wireless input/output terminal that captures information to be recorded in the optical disc information device 607 or outputs information read by the optical disc information device 607 to the outside. With this, the computer 609 can exchange information with a plurality of devices connected to networks such as, e.g., computers, telephones, or television tuners, and can be used as an information server (optical disc server) shared by the plurality of the devices. In addition, the computer 609 can stably record information in different types of optical discs or reproduce the information recorded therein, and hence the computer 609 can be used in a wide variety of applications.

Further, the computer 609 can record/accumulate a large volume of information by including a changer that loads and ejects a plurality of the optical discs into and from the optical disc information device 607. In addition, the computer 609 may include a plurality of the optical disc information devices 607 and may be configured to record information in a plurality of the optical discs or reproduce the information recorded therein simultaneously. With this, it is possible to increase a transfer rate and reduce waiting time required to replace the optical disc.

Fourth Embodiment

An optical disc player according to a fourth embodiment includes the optical disc information device according to the first embodiment or the second embodiment.

Figure 25:
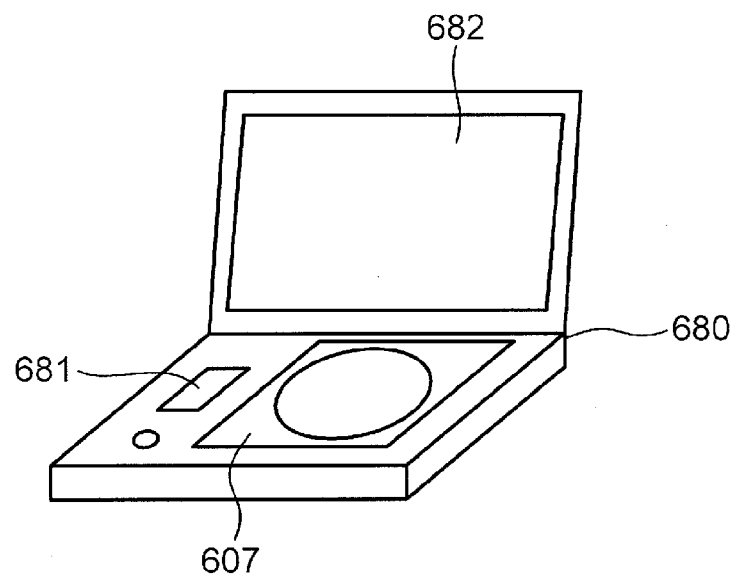
FIG. 25 is a perspective view showing a schematic configuration of an optical disc player according to a fourth embodiment of the present invention.

FIG. 25 is a perspective view showing the schematic configuration of the optical disc player according to the fourth embodiment of the present invention.

An optical disc player 680 shown in FIG. 25 includes the optical disc information device 607 according to the first embodiment or the second embodiment, and a decoder 681 that converts an information signal obtained from the optical disc information device 607 to an image signal. In addition, the optical disc player 680 can be used as a car navigation system. Further, the optical disc player 680 may be configured to include a display device 682 such as a liquid crystal monitor or the like.

The optical disc player 680 according to the present fourth embodiment includes the optical disc information device 607 according to the first embodiment or the second embodiment, and is capable of reducing the crosstalk without increasing the noise even in the case of the optical disc having a narrow track pitch, and hence the optical disc player 680 can reproduce information recorded at a high density at a low error rate, and can be used in a wide variety of applications.

Fifth Embodiment

An optical disc recorder according to a fifth embodiment includes the optical disc information device according to the first embodiment or the second embodiment.

Figure 26:
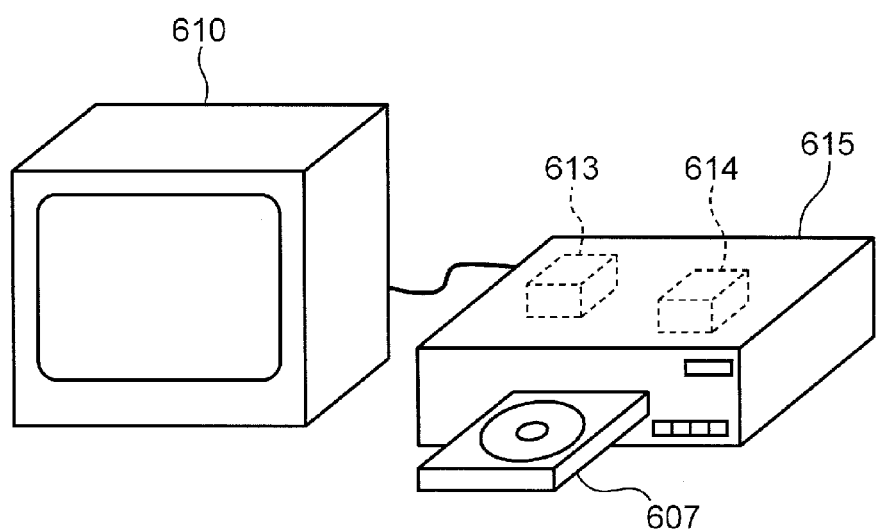
FIG. 26 is a perspective view showing a schematic configuration of an optical disc recorder according to a fifth embodiment of the present invention.
Figure 27:
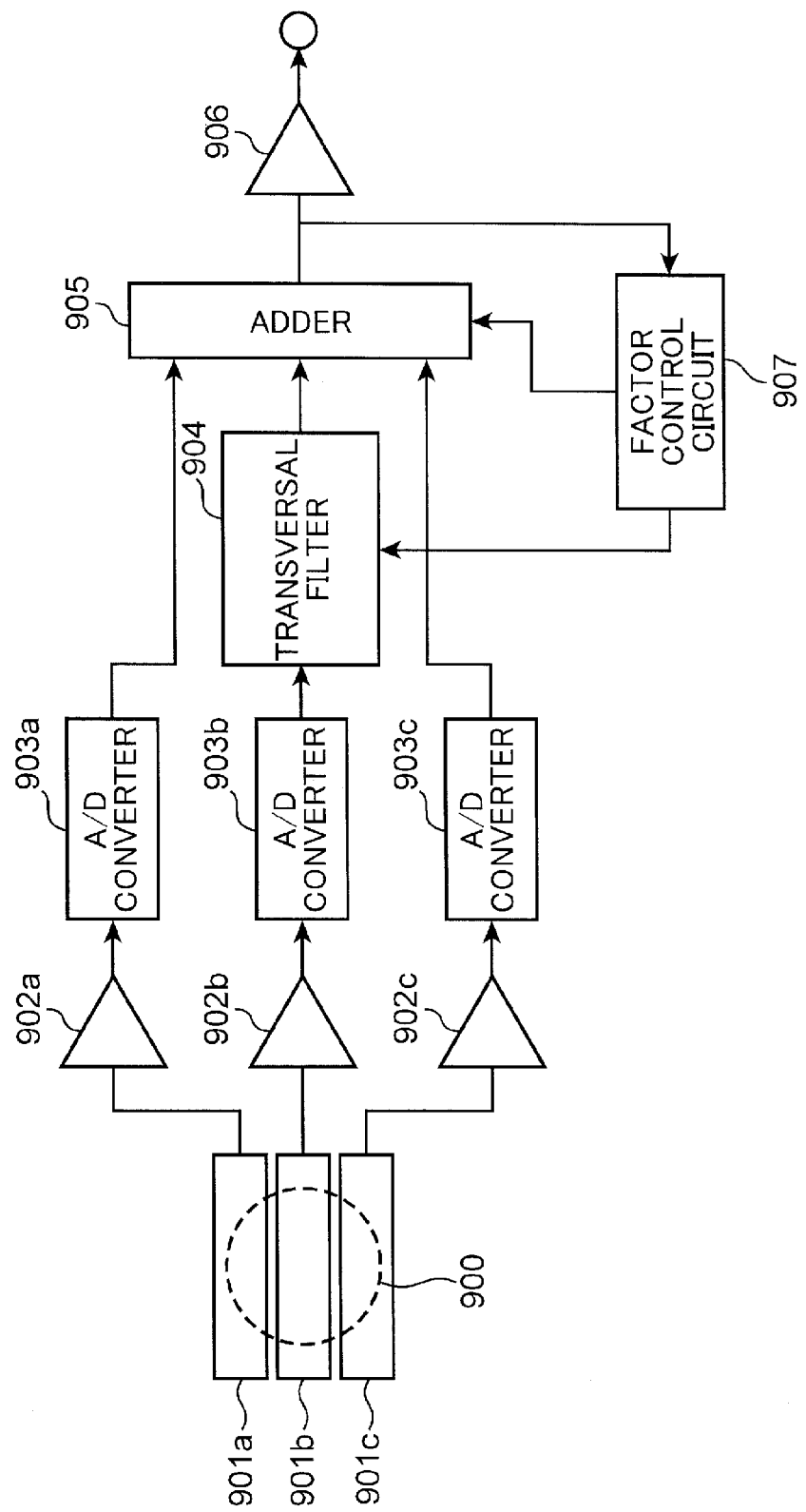
FIG. 27 is a view showing a configuration of a conventional photodetector.

FIG. 26 is a perspective view showing the schematic configuration of the optical disc player according to the fifth embodiment of the present invention.

An optical disc recorder 615 shown in FIG. 26 includes the optical disc information device 607 according to the first embodiment or the second embodiment, and an encoder 613 that converts the image signal to the information signal to be recorded in the optical disc by the optical disc information device 607.

Note that the optical disc recorder 615 preferably also includes a decoder 614 that converts the information signal obtained from the optical disc information device 607 to the image signal. According to this configuration, it becomes possible to reproduce recorded information. Further, the optical disc recorder 615 may include an output device 610 such as the cathode-ray tube or the liquid crystal display device that displays information.

The optical disc recorder 615 according to the present fifth embodiment includes the optical disc information device 607 according to the first embodiment or the second embodiment, and is capable of reducing the crosstalk without increasing the noise even in the case of the optical disc having a narrow track pitch, and hence the optical disc recorder 615 can reproduce information recorded at a high density at a low error rate, and can be used in a wide variety of applications.

Note that the above-described specific embodiments mainly include the invention having the following configurations.

An optical information device according to an aspect of the present invention includes a laser light source that emits a light flux, an objective lens that converges the light flux emitted from the laser light source on an optical information medium having an information track on which information is recorded in a row, a split element that includes a center region including the center of an optical axis, a first end region disposed adjacent to one side of the center region in a direction perpendicular to a tangent to the information track, and a second end region disposed adjacent to the other side of the center region in the direction perpendicular to the tangent to the information track, and splits the light flux reflected and diffracted on the optical information medium into a first light flux passing through the center region, a second light flux passing through the first end region, and a third light flux passing through the second end region, a photodetector that receives the first light flux, the second light flux, and the third light flux obtained by splitting by the split element, and outputs a first signal, a second signal, and a third signal corresponding to light amounts of the received first light flux, the received second light flux, and the received third light flux, a first waveform equalizer that gives a gain corresponding to a frequency component of the first signal to the first signal outputted from the photodetector, a second waveform equalizer that gives a gain different from the gain of the first signal corresponding to a frequency component of the second signal to the second signal outputted from the photodetector, a third waveform equalizer that gives a gain different from the gains of the first signal and the second signal corresponding to a frequency component of the third signal to the third signal outputted from the photodetector, an adder that adds up output signals from the first waveform equalizer, the second waveform equalizer, and the third waveform equalizer, and a reproduction signal processing section that outputs a signal obtained by the addition by the adder as an information reproduction signal, the information track scanned with the light flux converged by the objective lens is assumed to be a main track and the information track adjacent to the main track is assumed to be an adjacent track, the first signal, the second signal, and the third signal outputted from the photodetector include both of information recorded on the main track and information recorded on the adjacent track, a ratio Xm of the information recorded on the adjacent track relative to the information recorded on the main track included in the first signal obtained from the first light flux having passed through the center region is different from a ratio Xs1 of the information recorded on the adjacent track relative to the information recorded on the main track included in the second signal obtained from the second light flux having passed through the first end region and also different from a ratio Xs2 of the information recorded on the adjacent track relative to the information recorded on the main track included in the third signal obtained from the third light flux having passed through the second end region, and a ratio among the respective gains of the first waveform equalizer, the second waveform equalizer, and the third waveform equalizer is determined so as to cancel the information recorded on the adjacent track in each of the frequency components of the first signal, the second signal, and the third signal.

According to this configuration, the first signal, the second signal, and the third signal outputted from the photodetector include both of the information recorded on the main track and the information recorded on the adjacent track. The ratio Xm of the information recorded on the adjacent track relative to the information recorded on the main track that are included in the first signal obtained from the first light flux having passed through the center region is different from the ratio Xs1 of the information recorded on the adjacent track relative to the information recorded on the main track that are included in the second signal obtained from the second light flux having passed through the first end region and the ratio Xs2 of the information recorded on the adjacent track relative to the information recorded on the main track that are included in the third signal obtained from the third light flux having passed through the second end region. The ratio among the respective gains of the first waveform equalizer, the second waveform equalizer, and the third waveform equalizer is determined so as to cancel the information recorded on the adjacent track by using a difference between the ratio Xm and the ratio Xs1 and a difference between the ratio Xm and the ratio Xs2 in each of the frequency components of the first signal, the second signal, and the third signal.

Consequently, it is possible to reduce the crosstalk amount form the adjacent track, and reproduce information at a low error rate even when the recording density in a track direction is increased.

In addition, in the optical information device described above, when a wavelength of the light flux is represented by $\lambda$ and a numerical aperture of the objective lens is represented by NA, a pitch Tp of the information track is preferably smaller than a distance equivalent to optical cutoff $Fc=\lambda/(2 \cdot NA)$.

According to this configuration, the pitch Tp of the information track is smaller than the distance equivalent to optical cutoff $Fc=\lambda/(2 \cdot NA)$. That is, in order to virtually obtain the crosstalk reduction effect, the ratio of the information on the adjacent track needs to be high. When the ratio of the information on the adjacent track is low, the effect of reducing the crosstalk amount that is small from the beginning is small as compared with the increase in noise or the like by the arithmetic operation for the correction. To cope with this, by reducing the pitch Tp of the information track to a value smaller than the distance equivalent to optical cutoff $Fc=\lambda/(2 \cdot NA)$, it is possible to reliably reduce the crosstalk amount from the adjacent track.

Further, in the optical information device described above, the gains of the first waveform equalizer, the second waveform equalizer, and the third waveform equalizer are preferably determined such that a reproduction frequency characteristic of the information recorded on the main track matches an ideal frequency characteristic assumed in the reproduction signal processing section.

According to this configuration, the gains of the first waveform equalizer, the second waveform equalizer, and the third waveform equalizer are determined such that the reproduction frequency characteristic of the information recorded on the main track matches the ideal frequency characteristic assumed in the reproduction signal processing section.

Consequently, even in the case where the information track pitch is narrow, it is possible to obtain an ideal reproduction signal waveform having sufficiently small crosstalk, and reproduce information at a low error rate.

Furthermore, in the optical information device described above, a ratio of the gain of the second waveform equalizer relative to the gain of the first waveform equalizer is preferably made proportional to a reciprocal of a ratio between the ratio Xm and the ratio Xs1 in each frequency component, and a ratio of the gain of the third waveform equalizer relative to the gain of the first waveform equalizer is preferably made proportional to a reciprocal of a ratio between the ratio Xm and the ratio Xs2 in each frequency component.

According to this configuration, the ratio of the gain of the second waveform equalizer relative to the gain of the first waveform equalizer is made proportional to the reciprocal of the ratio between the ratio Xm and the ratio Xs1 in each frequency component and the ratio of the gain of the third waveform equalizer relative to the gain of the first waveform equalizer is made proportional to the reciprocal of the ratio between the ratio Xm and the ratio Xs2 in each frequency component, whereby it is possible to cancel the information recorded on the adjacent track.

Moreover, in the optical information device described above, a width of the center region in the direction perpendicular to the tangent to the information track is preferably gradually reduced from the center of the split element toward an end of the split element in a direction of the tangent to the information track.

According to this configuration, the frequency characteristic of the signal obtained from the light beam having passed through each of the first end region and the second end region has a high frequency component, and hence the waveform equalization coefficient becomes less likely to diverge even in the high frequency component. Consequently, it becomes easy to cause the signal after the waveform equalization to have the ideal PR waveform and reduce the crosstalk, and it becomes possible to reproduce information at a low error rate.

In addition, in the optical information device described above, the split element preferably further includes a first island-like region formed into an island-like shape on the center region in a vicinity of the first end region and a second island-like region formed into the island-like shape on the center region in a vicinity of the second end region, a signal obtained from a light flux having passed through the first island-like region is preferably outputted together with the second signal obtained from the second light flux having passed through the first end region, and a signal obtained from a light flux having passed through the second island-like region is preferably outputted together with the third signal obtained from the third light flux having passed through the second end region.

According to this configuration, the split element further includes the first island-like region formed into the island-like shape on the center region in the vicinity of the first end region and the second island-like region formed into the island-like shape on the center region in the vicinity of the second end region. The signal obtained from the light flux having passed through the first island-like region is outputted together with the second signal obtained from the second light flux having passed through the first end region. In addition, the signal obtained from the light flux having passed through the second island-like region is outputted together with the third signal obtained from the third light flux having passed through the second end region.

Consequently, with the presence of the first island-like region and the second island-like region, even in the case where one of the first end region and the second end region is reduced due to lens shift, it is possible to alleviate the degree of the change. In addition, in the case where radial tilt occurs as well, it is possible to alleviate the change and increase the margin of the crosstalk reduction effect. With this, it becomes possible to reproduce information at a low error rate.

Further, in the optical information device described above, the center region is preferably further split into two regions by a splitting line parallel with the tangent to the information track.

According to this configuration, since the center region is further split into two regions by the splitting line parallel with the tangent to the information track, four light fluxes obtained by splitting by the split element are received by a photodetector having four light receiving sections. Subsequently, four signals outputted from the four light receiving sections are subjected to waveform equalization by four waveform equalizers.

Consequently, by using the four waveform equalizers, it is possible to provide a condition that minimizes the crosstalk from not only the right and left adjacent information tracks but also outer adjacent information tracks adjacent to the right and left adjacent information tracks. Further, even in the case where the split positions of the regions of the split element become asymmetrical in the direction perpendicular to the tangent to the information track due to lens shift or radial tilt, it is possible to suppress a reduction in crosstalk reduction capability by appropriately changing the coefficients of the four waveform equalizers. With this, the range in which the crosstalk is reduced is increased, and it becomes possible to reproduce information at a low error rate.

Furthermore, in the optical information device described above, when the wavelength of the light flux is represented by $\lambda$ and the numerical aperture of the objective lens is represented by NA, a gain of a middle frequency as a half of a high frequency corresponding to the distance equivalent to optical cutoff $Fc=\lambda/(2\cdot NA)$ is preferably larger than a gain of the high frequency in each of the second waveform equalizer and the third waveform equalizer, and the gain of the high frequency is preferably larger than the gain of the middle frequency in the first waveform equalizer.

According to this configuration, the gain of the middle frequency as the half of the high frequency corresponding to the distance equivalent to optical cutoff $Fc=\lambda/(2\cdot NA)$ is larger than the gain of the high frequency in each of the second waveform equalizer and the third waveform equalizer. In addition, the gain of the high frequency is larger than the gain of the middle frequency in the first waveform equalizer.

Consequently, in the optical disc in which information is recorded at a high density with the track pitch that is equal to or lower than the diffraction limit of the light beam or in the vicinity of the diffraction limit thereof, the deterioration of S/N of the signal due to an extreme increase in noise is prevented, and it is possible to reduce the crosstalk amount from the adjacent track, and reproduce information at a low error rate even when the recording density in the track direction is increased.

Moreover, in the optical information device described above, the middle frequency is preferably in a band of a signal frequency corresponding to a period that is 1.3 times to 30 times the distance Fc equivalent to optical cutoff, and the high frequency is preferably in a band of a signal frequency corresponding to a period that is shorter than 1.3 times the distance Fc equivalent to optical cutoff.

According to this configuration, since the middle frequency is in the band of the signal frequency corresponding to the period that is 1.3 times to 30 times the distance equivalent to optical cutoff Fc, and the high frequency is in the band of the signal frequency corresponding to the period that is shorter than 1.3 times the distance equivalent to optical cutoff Fc, it is possible to suppress the noise to cancel the crosstalk within the range described above.

In addition, in the optical information device described above, the middle frequency is preferably in a band of a signal frequency corresponding to a period that is 1.5 times to 4 times the distance Fc equivalent to optical cutoff.

According to this configuration, since the middle frequency is in the band of the signal frequency corresponding to the period that is 1.5 times to 4 times the distance equivalent to optical cutoff Fc, it is possible to further suppress the noise to cancel the crosstalk within the range described above.

A crosstalk reduction method according to another aspect of the present invention includes: a step of emitting a light flux from a laser light source; a step of converging the light flux emitted from the laser light source on an optical information medium having an information track on which information is recorded in a row by using an objective lens; a step of splitting the light flux reflected and diffracted on the optical information medium into a first light flux passing through a center region, a second light flux passing through a first end region, and a third light flux passing through a second end region by using a split element that includes the center region including the center of an optical axis, the first end region disposed adjacent to one side of the center region in a direction perpendicular to a tangent to the information track, and the second end region disposed adjacent to the other side of the center region in the direction perpendicular to the tangent to the information track; a step of receiving the first light flux, the second light flux, and the third light flux obtained by the splitting, and outputting a first signal, a second signal, and a third signal corresponding to light amounts of the received first light flux, the received second light flux, and the received third light flux by using a photodetector; a step of giving a gain corresponding to a frequency component of the first signal to the outputted first signal by using a first waveform equalizer; a step of giving a gain different from the gain of the first signal corresponding to a frequency component of the second signal to the outputted second signal by using a second waveform equalizer; step of giving a gain different from the gains of the first signal and the second signal corresponding to a frequency component of the third signal to the outputted third signal by using a third waveform equalizer; a step of adding up output signals from the first waveform equalizer, the second waveform equalizer, and the third waveform equalizer; and a step of outputting a signal obtained by the addition as an information reproduction signal, wherein the information track scanned with the light flux converged by the objective lens is assumed to be a main track, and the information track adjacent to the main track is assumed to be an adjacent track, the first signal, the second signal, and the third signal outputted from the photodetector include both of information recorded on the main track and information recorded on the adjacent track, a ratio Xm of the information recorded on the adjacent track relative to the information recorded on the main track included in the first signal obtained from the first light flux having passed through the center region is different from a ratio Xs1 of the information recorded on the adjacent track relative to the information recorded on the main track included in the second signal obtained from the second light flux having passed through the first end region and also different from a ratio Xs2 of the information recorded on the adjacent track relative to the information recorded on the main track included in the third signal obtained from the third light flux having passed through the second end region, and a ratio among the respective gains of the first waveform equalizer, the second waveform equalizer, and the third waveform equalizer is determined so as to cancel the information recorded on the adjacent track in each of the frequency components of the first signal, the second signal, and the third signal.

According to this configuration, the first signal, the second signal, and the third signal outputted from the photodetector include both of the information recorded on the main track and the information recorded on the adjacent track. The ratio Xm of the information recorded on the adjacent track relative to the information recorded on the main track that are included in the first signal obtained from the first light flux having passed through the center region is different from the ratio Xs1 of the information recorded on the adjacent track relative to the information recorded on the main track that are included in the second signal obtained from the second light flux having passed through the first end region and the ratio Xs2 of the information recorded on the adjacent track relative to the information recorded on the main track that are included in the third signal obtained from the third light flux having passed through the second end region. The ratio among the respective gains of the first waveform equalizer, the second waveform equalizer, and the third waveform equalizer is determined so as to cancel the information recorded on the adjacent track by using a difference between the ratio Xm and the ratio Xs1 and a difference between the ratio Xm and the ratio Xs2 in each of the frequency components of the first signal, the second signal, and the third signal.

Consequently, it is possible to reduce the crosstalk amount from the adjacent track, and reproduce information at a low error rate even when the recording density in the track direction is increased.

A computer according to still another aspect of the present invention includes any one of the optical information devices described above, an input section that inputs information, an arithmetic unit that performs an arithmetic operation based on information inputted by the input section and/or information reproduced by the optical information device, and an output section that outputs the information inputted by the input section, the information reproduced by the optical information device, and/or a result of the arithmetic operation by the arithmetic unit. According to this configuration, it is possible to apply the above-described optical information device to the computer.

A player according to yet another aspect of the present invention includes any one of the optical information devices described above, and a decoder that converts an information signal obtained from the optical information device to image information. According to this configuration, it is possible to apply the above-described optical information device to the player.

A recorder according to still another aspect of the present invention includes any one of the optical information devices described above, and an encoder that converts image information to an information signal to be recorded by the optical information device. According to this configuration, it is possible to apply the above-described optical information device to the recorder.

The specific embodiments or examples provided in Description of Embodiments are merely intended to clarify the technical nature of the present invention, and the present invention should not be understood narrowly as limited only to such specific examples. Various modifications can be made within the spirit of the present invention and the scope of claims.

INDUSTRIAL APPLICABILITY

The optical information device and the crosstalk reduction method according to the present invention are capable of stably reproducing information from an optical disc of which the density is increased by reducing a track pitch, and are useful as an optical information device that records or reproduce information for an optical information medium, and a crosstalk reduction method that reduces crosstalk occurring in the optical information device.

In addition, the optical information device according to the present invention can be used in a large capacity memory device for a computer, a server, a computer, a player, and a recorder.

The invention claimed is:

1. An optical information device comprising:
   a laser light source that emits a light flux;
   an objective lens that converges the light flux emitted from the laser light source on an optical information medium having an information track on which information is recorded in a row;
   a split element that includes a center region including the center of an optical axis, a first end region disposed adjacent to one side of the center region in a direction perpendicular to a tangent to the information track, and a second end region disposed adjacent to the other side of the center region in the direction perpendicular to the tangent to the information track, and splits the light flux reflected and diffracted on the optical information medium into a first light flux passing through the center region, a second light flux passing through the first end region, and a third light flux passing through the second end region;

a photodetector that receives the first light flux, the second light flux, and the third light flux obtained by splitting by the split element, and outputs a first signal, a second signal, and a third signal corresponding to light amounts of the received first light flux, the received second light flux, and the received third light flux;

a first waveform equalizer that gives a gain corresponding to a frequency component of the first signal to the first signal outputted from the photodetector;

a second waveform equalizer that gives a gain different from the gain of the first signal corresponding to a frequency component of the second signal to the second signal outputted from the photodetector;

a third waveform equalizer that gives a gain different from the gains of the first signal and the second signal corresponding to a frequency component of the third signal to the third signal outputted from the photodetector;

an adder that adds up output signals from the first waveform equalizer, the second waveform equalizer, and the third waveform equalizer; and a reproduction signal processing section that outputs a signal obtained by the addition by the adder as an information reproduction signal, wherein the information track scanned with the light flux converged by the objective lens is assumed to be a main track, and the information track adjacent to the main track is assumed to be an adjacent track, the first signal, the second signal, and the third signal outputted from the photodetector include both of information recorded on the main track and information recorded on the adjacent track, a ratio Xm of the information recorded on the adjacent track relative to the information recorded on the main track included in the first signal obtained from the first light flux having passed through the center region is different from a ratio Xs1 of the information recorded on the adjacent track relative to the information recorded on the main track included in the second signal obtained from the second light flux having passed through the first end region and also different from a ratio Xs2 of the information recorded on the adjacent track relative to the information recorded on the main track included in the third signal obtained from the third light flux having passed through the second end region, and a ratio among the respective gains of the first waveform equalizer, the second waveform equalizer, and the third waveform equalizer is determined so as to cancel the information recorded on the adjacent track in each of the frequency components of the first signal, the second signal, and the third signal.

2. The optical information device according to claim 1, wherein when a wavelength of the light flux is represented by $\lambda$ and a numerical aperture of the objective lens is represented by NA, a pitch Tp of the information track is smaller than a distance equivalent to optical cutoff $Fc=\lambda/(2 \cdot NA)$.

3. The optical information device according to claim 1, wherein the gains of the first waveform equalizer, the second waveform equalizer, and the third waveform equalizer are determined such that a reproduction frequency characteristic of the information recorded on the main track matches an ideal frequency characteristic assumed in the reproduction signal processing section.

4. The optical information device according to claim 1, wherein a ratio of the gain of the second waveform equalizer relative to the gain of the first waveform equalizer is made proportional to a reciprocal of a ratio between the ratio Xm and the ratio Xs1 in each frequency component, and a ratio of the gain of the third waveform equalizer relative to the gain of the first waveform equalizer is made proportional to a reciprocal of a ratio between the ratio Xm and the ratio Xs2 in each frequency component.

5. The optical information device according to claim 1, wherein a width of the center region in the direction perpendicular to the tangent to the information track is gradually reduced from the center of the split element toward an end of the split element in a direction of the tangent to the information track.

6. The optical information device according to claim 5, wherein the split element further includes a first island-like region formed into an island-like shape on the center region in a vicinity of the first end region and a second island-like region formed into the island-like shape on the center region in a vicinity of the second end region, a signal obtained from a light flux having passed through the first island-like region is outputted together with the second signal obtained from the second light flux having passed through the first end region, and a signal obtained from a light flux having passed through the second island-like region is outputted together with the third signal obtained from the third light flux having passed through the second end region.

7. The optical information device according to claim 1, wherein the center region is further split into two regions by a splitting line parallel with the tangent to the information track.

8. The optical information device according to claim 1, wherein when the wavelength of the light flux is represented by $\lambda$ and the numerical aperture of the objective lens is represented by NA, a gain of a middle frequency as a half of a high frequency corresponding to the distance equivalent to optical cutoff $Fc=\lambda/(2 \cdot NA)$ is larger than a gain of the high frequency in each of the second waveform equalizer and the third waveform equalizer, and the gain of the high frequency is larger than the gain of the middle frequency in the first waveform equalizer.

9. The optical information device according to claim 8, wherein the middle frequency is in a band of a signal frequency corresponding to a period that is 1.3 times to 30 times the distance Fc equivalent to optical cutoff, and the high frequency is in a band of a signal frequency corresponding to a period that is shorter than 1.3 times the distance Fc equivalent to optical cutoff.

10. The optical information device according to claim 8, wherein the middle frequency is in a band of a signal frequency corresponding to a period that is 1.5 times to 4 times the distance Fc equivalent to optical cutoff.

11. A crosstalk reduction method comprising:

a step of emitting a light flux from a laser light source;

a step of converging the light flux emitted from the laser light source on an optical information medium having an information track on which information is recorded in a row by using an objective lens;

a step of splitting the light flux reflected and diffracted on the optical information medium into a first light flux passing through a center region, a second light flux passing through a first end region, and a third light flux passing through a second end region by using a split element that includes the center region including the center of an optical axis, the first end region disposed adjacent to one side of the center region in a direction perpendicular to a tangent to the information track, and the second end region disposed adjacent to the other side of the center region in the direction perpendicular to the tangent to the information track;

a step of receiving the first light flux, the second light flux, and the third light flux obtained by the splitting, and outputting a first signal, a second signal, and a third signal corresponding to light amounts of the received first light flux, the received second light flux, and the received third light flux by using a photodetector;

a step of giving a gain corresponding to a frequency component of the first signal to the outputted first signal by using a first waveform equalizer;

a step of giving a gain different from the gain of the first signal corresponding to a frequency component of the second signal to the outputted second signal by using a second waveform equalizer;

a step of giving a gain different from the gains of the first signal and the second signal corresponding to a frequency component of the third signal to the outputted third signal by using a third waveform equalizer;

a step of adding up output signals from the first waveform equalizer, the second waveform equalizer, and the third waveform equalizer; and a step of outputting a signal obtained by the addition as an information reproduction signal, wherein the information track scanned with the light flux converged by the objective lens is assumed to be a main track, and the information track adjacent to the main track is assumed to be an adjacent track, the first signal, the second signal, and the third signal outputted from the photodetector include both of information recorded on the main track and information recorded on the adjacent track, a ratio $Xm$ of the information recorded on the adjacent track relative to the information recorded on the main track included in the first signal obtained from the first light flux having passed through the center region is different from a ratio $Xs1$ of the information recorded on the adjacent track relative to the information recorded on the main track included in the second signal obtained from the second light flux having passed through the first end region and also different from a ratio $Xs2$ of the information recorded on the adjacent track relative to the information recorded on the main track included in the third signal obtained from the third light flux having passed through the second end region, and a ratio among the respective gains of the first waveform equalizer, the second waveform equalizer, and the third waveform equalizer is determined so as to cancel the information recorded on the adjacent track in each of the frequency components of the first signal, the second signal, and the third signal.

12. A computer comprising:
the optical information device according to claim 1;
an input section that inputs information;
an arithmetic unit that performs an arithmetic operation based on information inputted by the input section and/or information reproduced by the optical information device; and
an output section that outputs the information inputted by the input section, the information reproduced by the optical information device, and/or a result of the arithmetic operation by the arithmetic unit.

13. A player comprising:
the optical information device according to claim 1; and
a decoder that converts an information signal obtained from the optical information device to image information.

14. A recorder comprising:
the optical information device according to claim 1; and
an encoder that converts image information to an information signal to be recorded by the optical information device.

* * * * *